US011388999B1

(12) United States Patent
Horowitz et al.

(10) Patent No.: US 11,388,999 B1
(45) Date of Patent: Jul. 19, 2022

(54) LOUNGE CART

(71) Applicant: Brian Horowitz, Lake Forest, CA (US)

(72) Inventors: Brian Horowitz, Lake Forest, CA (US); William Ryczek, Pomona, CA (US); Thomas Wang, Alhambra, CA (US)

( * ) Notice: Subject to any disclaimer, the term of this patent is extended or adjusted under 35 U.S.C. 154(b) by 0 days.

(21) Appl. No.: 17/701,039

(22) Filed: Mar. 22, 2022

Related U.S. Application Data

(63) Continuation of application No. 17/692,055, filed on Mar. 10, 2022.

(51) Int. Cl.
  *A47C 1/14* (2006.01)
  *B62B 3/02* (2006.01)
  *A47C 13/00* (2006.01)

(52) U.S. Cl.
  CPC ............. *A47C 1/14* (2013.01); *A47C 13/00* (2013.01); *B62B 3/022* (2013.01); *B62B 2206/006* (2013.01)

(58) Field of Classification Search
  CPC ............ B62B 3/022; A47C 1/14; A47C 13/00
  See application file for complete search history.

(56) References Cited

U.S. PATENT DOCUMENTS

| 6,079,777 A * | 6/2000 | Simmons | A47C 13/00 297/30 |
| 8,042,819 B2 * | 10/2011 | Arnold | B64D 11/04 280/638 |
| 8,297,642 B2 * | 10/2012 | Tyson, III | A47C 1/14 280/643 |
| 9,145,154 B1 * | 9/2015 | Horowitz | B62B 3/02 |
| 9,221,484 B2 * | 12/2015 | Logvin | B62B 3/007 |
| 9,327,749 B2 * | 5/2016 | Young | B62B 5/08 |
| 9,526,236 B2 * | 12/2016 | Coker | A01K 97/08 |
| 9,861,087 B1 * | 1/2018 | Arrazola | B62B 3/005 |

(Continued)

OTHER PUBLICATIONS

Carino, "Costco is Selling a Wagon That Turns Into a Lounge Chair for the Perfect Day at the Beach", Mar. 23, 2021, Retrieved from KidsActivities.com blog on Mar. 10, 2022 https://kidsactivitiesblog.com/166324/costco-wagon-lounge-chair/.

(Continued)

*Primary Examiner* — Jonathan Ng
*Assistant Examiner* — James J Triggs
(74) *Attorney, Agent, or Firm* — Endurance Law Group PLC

(57) ABSTRACT

An apparatus configured to convert between a cart and a lounge chair comprising a bottom portion, backrest portion, a leg rest portion, first and second removable side portions. The backrest and leg rest potions rotatably coupled to the bottom portion and movable between open and upright positions. The first and second removable side portions being coupled to the backrest and leg portions when in the upright positions, wherein an open carton of the cart is formed by the bottom portion and the leg rest and backrest portions when in the upright positions, and the first and second removable side portions when connected to the leg rest and backrest sides, and the leg rest and backrest portions, when in the outward positions, form a seat, a leg rest and a backrest of the lounge chair, respectively, the lounge chair being configured to support a person in a sitting or lounging position.

20 Claims, 24 Drawing Sheets

(56) References Cited

U.S. PATENT DOCUMENTS

| | | | | |
|---|---|---|---|---|
| 10,040,470 | B1* | 8/2018 | Horowitz | B62B 3/102 |
| 10,214,230 | B2* | 2/2019 | Delgatty | B62B 3/022 |
| 10,227,791 | B2* | 3/2019 | Lindeman | E04H 15/34 |
| D860,572 | S* | 9/2019 | Zhu | D34/14 |
| D879,885 | S* | 3/2020 | Ostergaard | D21/425 |
| 10,610,025 | B1* | 4/2020 | Zhu | A47C 7/006 |
| 2021/0139062 | A1* | 5/2021 | Kelly | B62B 5/0013 |

OTHER PUBLICATIONS

Malo'o Racks, Lounge Wagon, Retrieved on Mar. 10, 2022 from https://malooracks.com/products/the-lounge-wagon?variant=39408921378887.

OME Gear "Wanderr 5-in-1 Transforming Outdoor Recreational Cart Chair", Retrieved Mar. 10, 2022 from https://factorypure.com/products/ome-gear-wanderr-5-in-1-transforming-outdoor-recreational-cart-chair-new.

OMG Gear, "Wanderr Transforming Cart", Retrieved on Mar. 10, 2022 from https://www.wayfair.com/outdoor/pdp/ome-gear-co-wanderr-transforming-cart-oege1000.html.

* cited by examiner

US 11,388,999 B1

LOUNGE CART

CROSS REFERENCE TO RELATED APPLICATIONS

This application claims priority to U.S. patent application Ser. 17/692,055 filed on Mar. 10, 2022, the entire disclosure of which is hereby incorporated by reference and relied upon.

Field of the Invention

The invention relates generally to mobile cart or wagon, and more particularly to a mobile cart or wagon configured to convert to a lounge chair.

BACKGROUND OF THE INVENTION

It is known for basket-carrying wagons to include one or more pairs of wheels to enable the movement of articles or items that are useful or desirable at a specific location or event. For example, a basket-carrying wagon may be used to transport useful articles to the beach, a festival (such as a music festival) or fireworks exhibition or show.

It may be desirable to use the basket-carrying wagon to transport children, blankets, chairs or lounge chairs, (beach) umbrellas to the specific location, for example, the beach or other location. In addition, it may be desirable to transport a cooler to keep beverages cold or perishable items fresh. However, the room available in any given wagon is limited. Thus, the more items carried in the wagon, the less room for other items. Thus, it may be desirable to provide a wagon that has more than one use and/or has other spacing saving features.

The present invention is aimed at one or more of the problems identified above.

BRIEF SUMMARY OF THE INVENTION

In a first aspect of the present invention, an apparatus configured to convert between a cart and a lounge chair is provided. The apparatus includes a bottom portion, a wheel assembly, a leg rest portion, a backrest portion, and first and second side portions. The bottom portion has first and second adjacent sides, a leg rest side and a backrest side. The first adjacent side is opposite the second adjacent side. The leg rest side is opposite the backrest side. Each of the first and second adjacent sides has first and second ends. The first and second ends of the first and second adjacent sides are connected to respective ends of the leg rest and backrest sides. The wheel assembly includes a pair of rear wheel assemblies and a pair of front wheel assemblies and is coupled to the bottom portion. The leg rest portion is rotatably coupled to the leg rest side of the bottom portion and is movable between an adjacent position and an upright position. The backrest portion is rotatably coupled to the backrest side of the bottom portion and is movable between an adjacent position and an upright position. The first side portion is configured to be moveable between a first configuration and a second configuration. The second side portion is configured to be moveable between a first configuration and a second configuration. The cart is formed by the bottom portion and the leg rest and backrest portions when in the upright positions, and the first and second side portions when in the first configuration and is configured to hold items placed therein. The bottom portion and the leg rest and backrest portions, when in the outward positions, form a seat, a leg rest and a backrest of the lounge chair, respectively. The lounge chair is configured to support a person in a sitting or lounging position.

In a second aspect of the present invention, an apparatus configured to convert between a cart and a lounge chair is provided. The apparatus includes a bottom portion, a wheel assembly, a leg rest portion, a backrest portion, first and second side portions, a handle and a cooler. The bottom portion has first and second adjacent sides, a leg rest side and a backrest side. The first adjacent side is opposite the second adjacent side. The leg rest side is opposite the backrest side. Each of the first and second adjacent sides has first and second ends. The first and second ends of the first and second adjacent sides are connected to respective ends of the leg rest and backrest sides. The bottom portion includes a lower frame assembly define a base plane of the apparatus. The wheel assembly includes a pair of rear wheel assemblies and a pair of front wheels assemblies and is coupled to the bottom portion. The leg rest portion is rotatably coupled to the leg rest side of the bottom portion and is movable between an outward position and an upright position. The leg rest portion includes a leg rest frame pivotably coupled to the leg rest side of the bottom portion a pair of hinges. The backrest portion is rotatably coupled to the backrest side of the bottom portion and is movable between an outward position and an upright position. The backrest portion includes a backrest frame coupled to the backrest side of the bottom portion by a pair of hinges. The first side portion is configured to be releasably coupled to the leg rest and backrest portions adjacent the first adjacent side when the leg rest and backrest sides are in the upright positions. The first side portion is configured to be moveable between a first configuration and a second configuration. The second side portion is configured to be moveable between a first configuration and a second configuration. The cart is formed by the bottom portion and the leg rest and backrest portions when in the upright positions, and the first and second side portions when in the first configuration and is configured to hold items placed therein. The bottom portion and the leg rest and backrest portions, when in the outward positions, form a seat, a leg rest and a backrest of the lounge chair, respectively. The lounge chair is configured to support a person in a sitting or lounging position. The handle is rotatably coupled to one of the adjacent sides of the bottom portion. The cooler is mounted below the bottom portion. The bottom portion includes an access section located therein to provide access to the cooler.

In a third aspect of the present invention, an apparatus configured to convert between a cart and a lounge chair is provided. The apparatus includes a bottom portion, a wheel assembly, a leg rest portion, a backrest portion, first and second side portions, a handle, a cooler and a flexible cover. The bottom portion has first and second adjacent sides, a leg rest side and a backrest side. The first adjacent side is opposite the second adjacent side. The leg rest side is opposite the backrest side. Each of the first and second adjacent sides has first and second ends. The first and second ends of the first and second adjacent sides are connected to respective ends of the leg rest and backrest. The bottom portion includes a lower frame assembly that defines a base plane of the apparatus. The lower frame assembly includes a caster rail assembly, first and second cross-tube supports and first and second cross tubes. The caster rail assembly has a first caster rail end and a second caster rail end and is located along the backrest side of the bottom portion. Each of the first and second cross-tube supports has a first end connected adjacent the first and second caster rail ends, respectively and extends away from the caster rail assembly towards respective second ends. The first and second cross-tube supports form the first and second adjacent sides, respectively, of the bottom portion. The first cross tube is coupled adjacent to, and extend between, the first ends of the first and second cross-tube supports. The second cross tube is coupled to, and extend between, the second ends of the first and second cross-tube supports. The wheel assembly is coupled to the bottom portion. The wheel assembly includes a pair of rear wheel assemblies coupled to the caster rail assembly adjacent the first caster rail end and the second caster rail end, respectively. The wheel assembly also includes a pair of front wheel assemblies coupled to first and second cross-tube supports, respectively, at the respective second end. The leg rest portion is rotatably coupled to the leg rest side of the bottom portion and is movable between an outward position and an upright position. The leg rest portion includes a leg rest frame pivotably coupled to the leg rest side of the bottom portion by a pair of hinges. The backrest portion is rotatably coupled to the backrest side of the bottom portion and is movable between an outward position and an upright position. The backrest portion includes a backrest frame coupled to the backrest side of the bottom portion by a pair of hinges. The first side portion is configured to be releasably coupled to the leg rest and backrest portions adjacent the first adjacent side when the leg rest and backrest sides are in the upright positions. The second side portion is configured to be releasably coupled to the leg rest and backrest portions adjacent the second adjacent side when the leg rest and backrest portions are in the upright positions. The cart is formed by the bottom portion and the leg rest and backrest portions when in the upright positions, and the first and second side portions when connected to the leg rest and backrest sides. The open carton of the cart is configured to hold items placed therein. The bottom portion and the leg rest and backrest portions, when in the outward positions, form a seat, a leg rest and a backrest of the lounge chair, respectively. The lounge chair is configured to support a person in a sitting or lounging position. Each of the first and second portions are coupled to the leg rest and backrest portions by a plurality of cargo-net hooks. The handle is rotatably coupled to one of the adjacent sides of the bottom portion. The cooler is mounted below the bottom portion. The bottom portion includes an access section located therein to provide access to the cooler. The leg rest frame, the lower frame assembly and the backrest frame define an upper edge, a lower edge and two side edges of the lounge chair. The flexible cover is coupled to, and supported by, the leg rest frame, lower frame assembly and backrest and extends from the upper edge to the lower edge and from one of the side edges to an opposite side edge. The flexible cover includes a flexible cover leg rest portion, a flexible cover seat portion, and a flexible cover backrest portion. The flexible cover leg rest portion and the leg rest frame form the leg rest portion, the flexible cover seat portion and the lower frame assembly forming the bottom portion. The flexible cover backrest portion and the backrest frame form the backrest portion.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 1A:
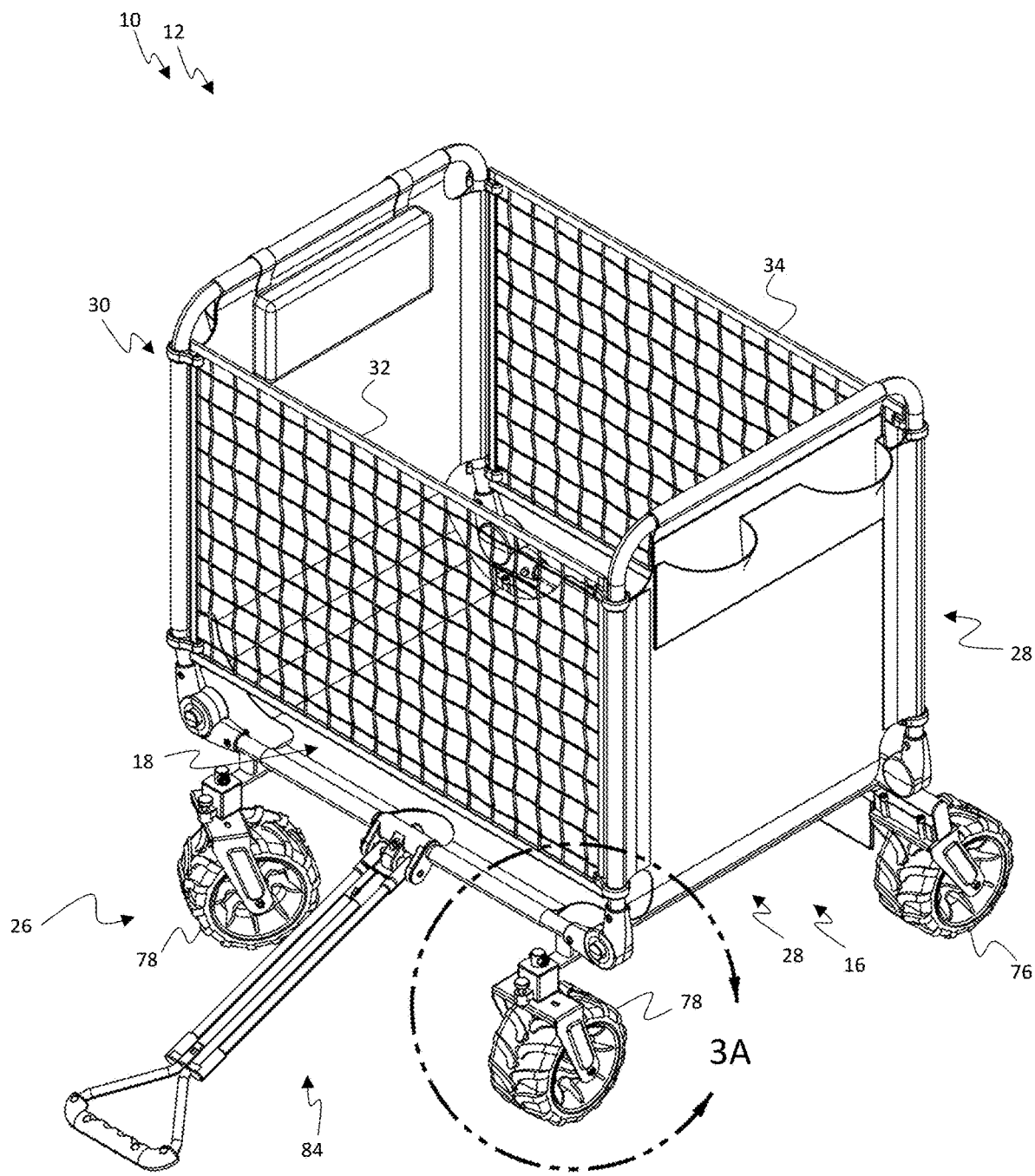
FIG. 1A is a first perspective view of an apparatus configured to convert between a mobile cart and a lounge chair, according to an embodiment of the present invention.
Figure 1B:
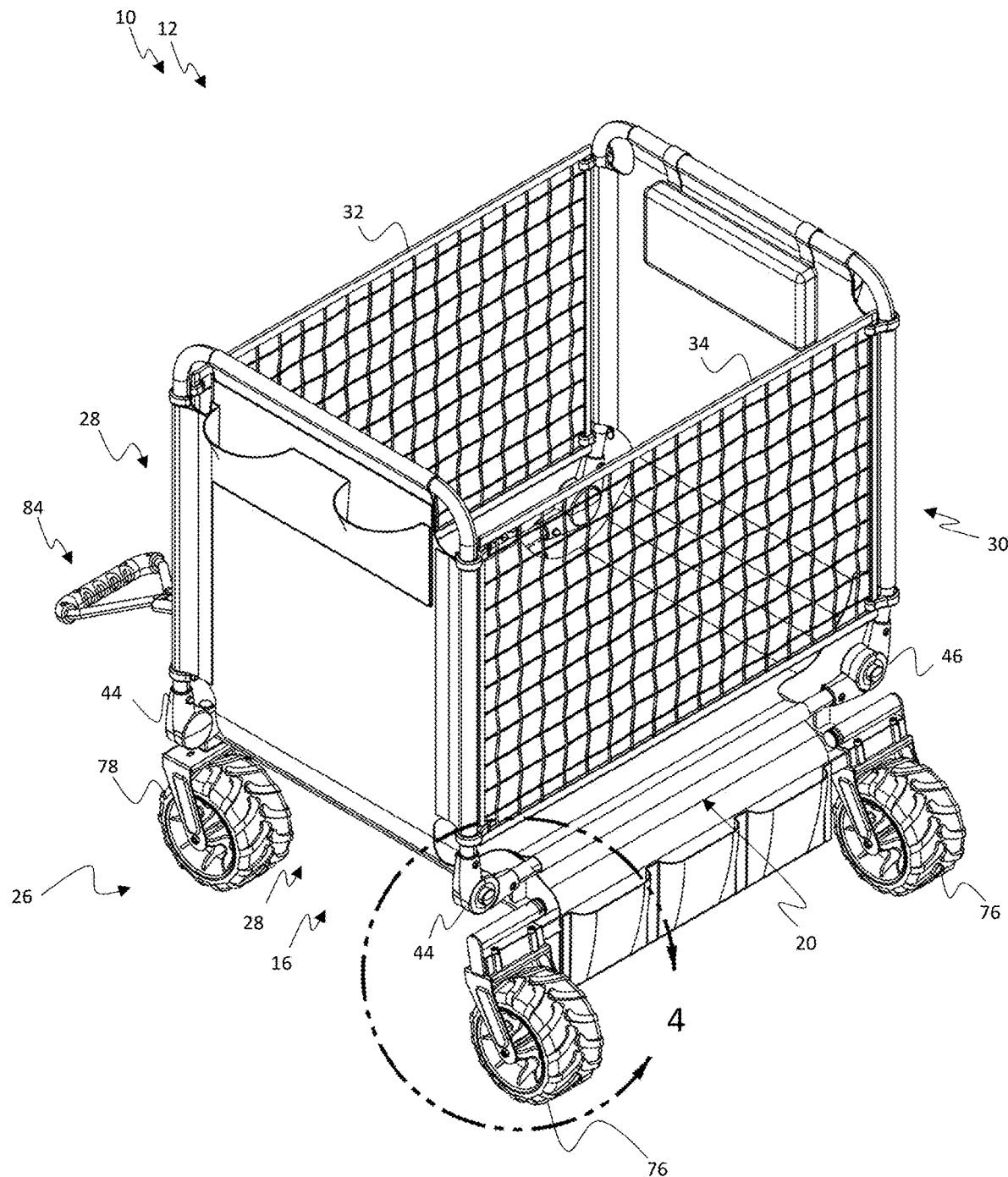
FIG. 1B is a second perspective view of the apparatus of FIG. 1A.
Figure 1C:
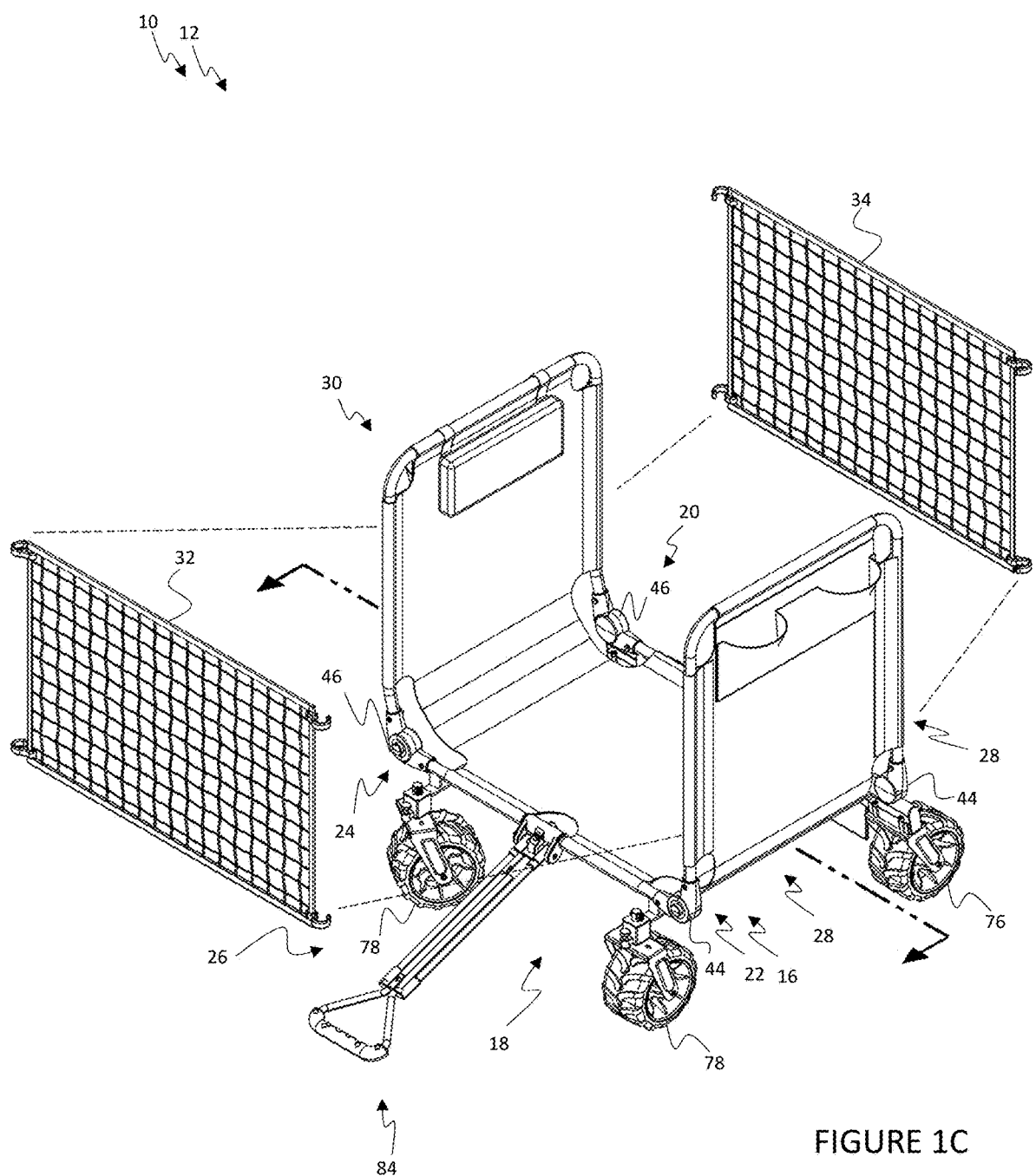
FIG. 1C is an exploded view of the apparatus of FIG. 1A.
Figure 1D:
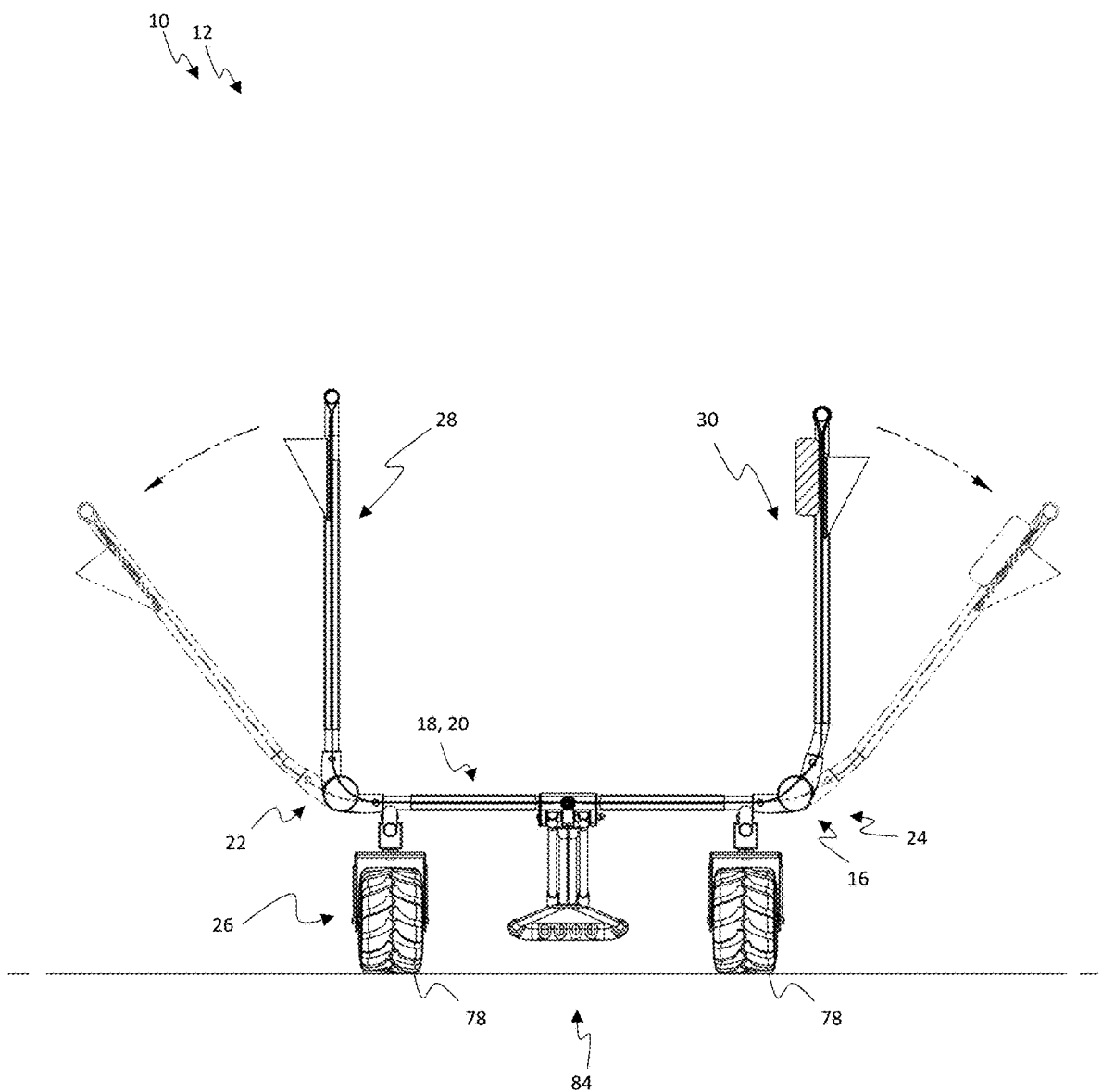
FIG. 1D is a first cross-sectional view of the apparatus of FIG. 1A.
Figure 1E:
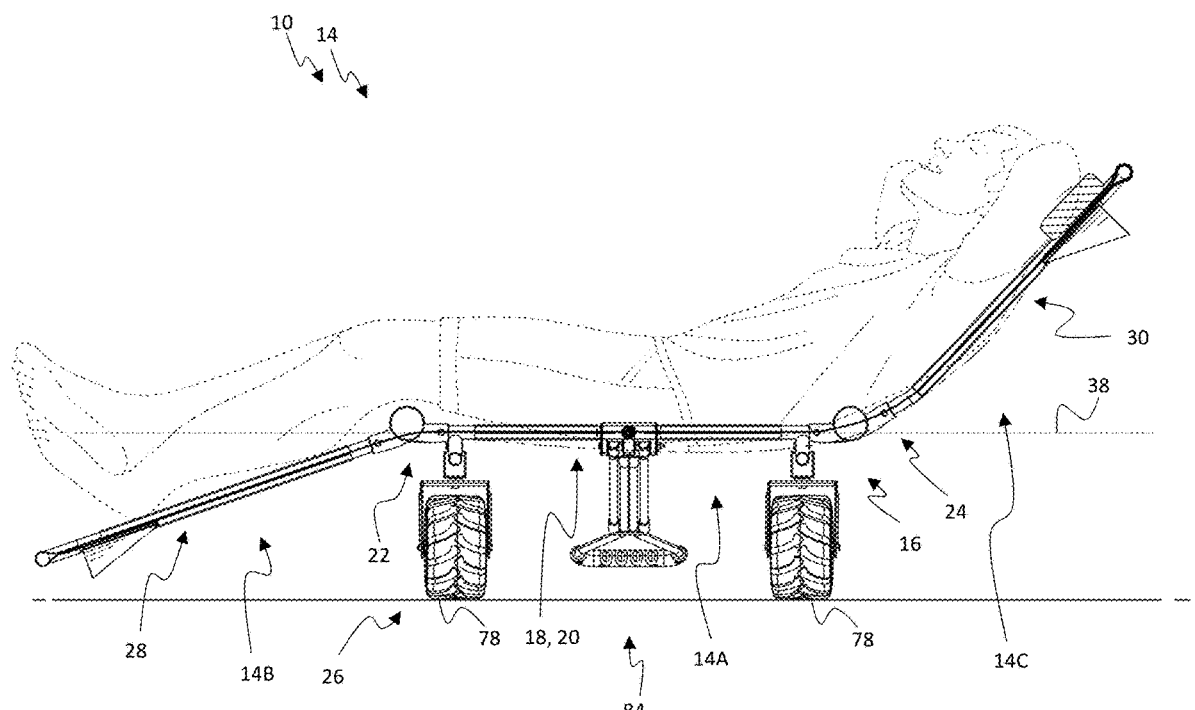
FIG. 1E is a second cross-sectional view of the apparatus of FIG. 1A.
Figure 1F:
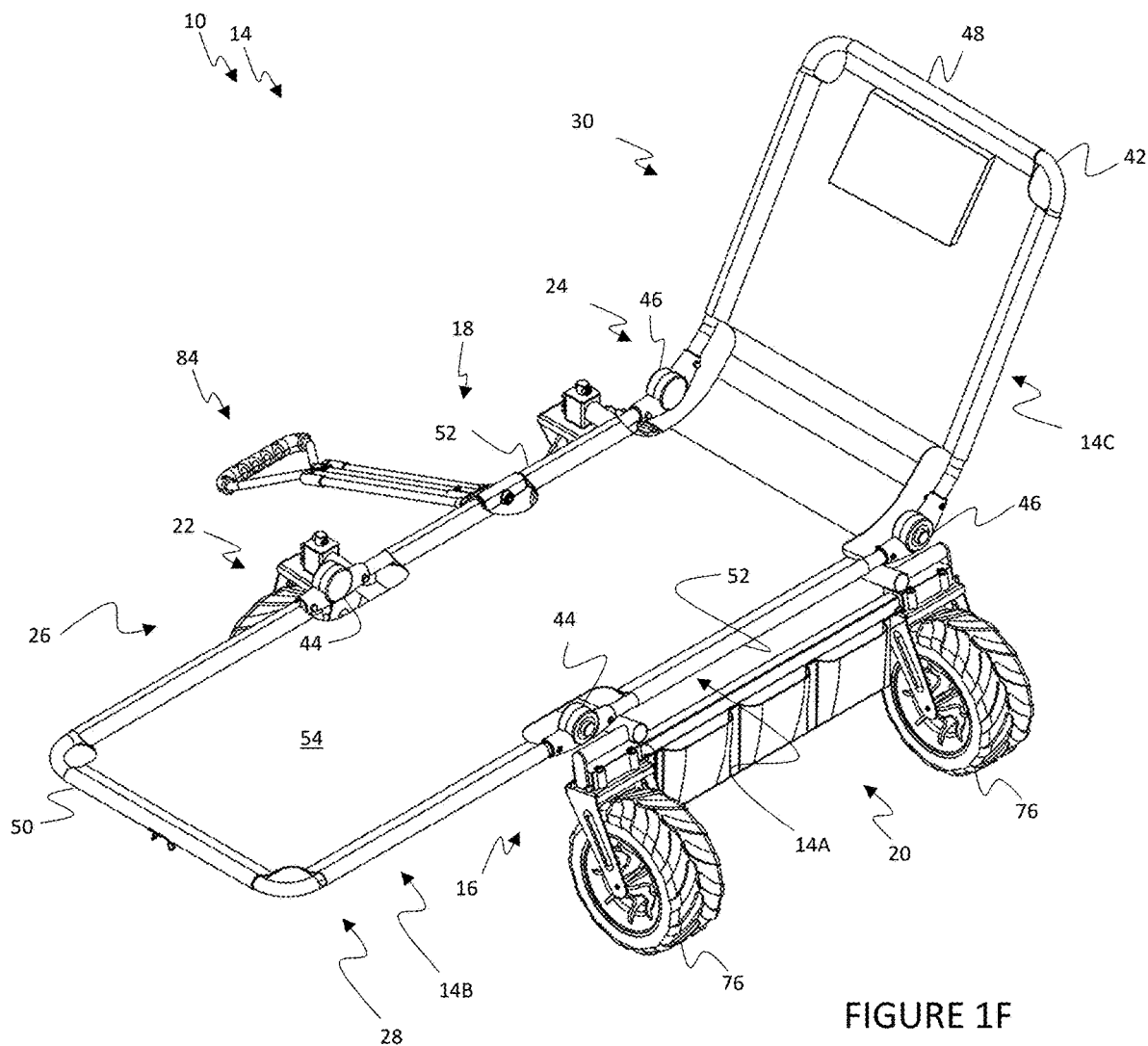
FIG. 1F is a third perspective view of the apparatus of FIG. 1A configured as a lounge chair.

Referring to the figures, wherein like numerals indicate like or corresponding parts throughout the several views, an apparatus 10 according to one embodiment of the present invention, is configured to convert between a cart 12 (as shown in FIGS. 1A-1B) and a lounge chair 14 (as shown in FIGS. 1E-1F). With specific references to FIGS. 1A-1F in the illustrated embodiment, the apparatus 10 includes a bottom portion 16, a wheel assembly 26, a leg rest portion 28, a backrest portion 30, a first side portion 32 and a second portion 34. The bottom portion 16 includes first and second adjacent sides 18, 20, a leg rest side 22 and a backrest side 24.

Figure 2:
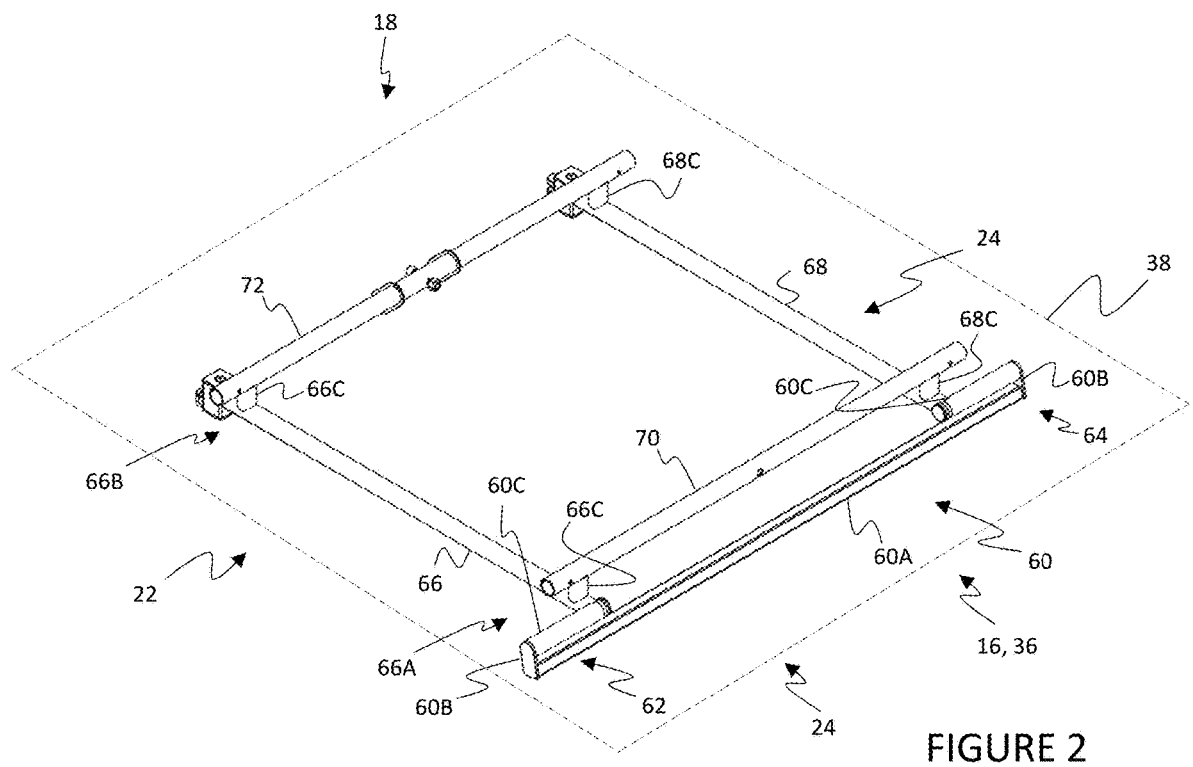
FIG. 2 is a perspective view of a lower frame assembly of a bottom portion of the apparatus of FIG. 1A, according to an embodiment of the present invention.

With reference to FIG. 2, in the illustrated embodiment, the bottom portion 16 includes a lower frame assembly 36. As shown, lower frame assembly 36 of the illustrated embodiment includes a caster rail assembly 60, first and second cross-tube supports 66, 68 and first and second cross tubes 70, 72.

The caster rail assembly 60 has a first caster rail end 62 and a second caster rail end 64 and located along the backrest side 24 of the bottom portion 16. Each of the first and second cross-tube supports 66, 68 has a first end 66A, 68A connected adjacent the first and second caster rail ends 62, 64, respectively. The first and second cross-tube supports 66, 68 extend away from the caster rail assembly 60 towards respective second ends 66B, 68B. The first and second cross-tube supports 66, 68 form the leg rest and backrest sides 22, 24, respectively, of the bottom portion 16. The first cross tube 70 is coupled adjacent to, and extending between, the first ends 66A, 68A of the first and second cross-tube supports 66, 68. The second cross tube 72 is coupled adjacent to, and extending between, the second ends 66B, 68B of the first and second cross-tube supports 66, 68. In the illustrated embodiment, the first and second cross-tube supports 66, 68 include a plurality of support extensions 66C, 68C. The first and second cross-tube supports 66, 68 each include a pivot center tube 66D, 68D located at the respective second end 66B, 68B. Each pivot center tube 66D, 68D has an associated central apertures 66E, 68E.

In the illustrated embodiment, the caster rail assembly 60 includes a caster rail 60A and an end cap 60B connected to each end of the cater rail 60A. A caster rail mount 60C extends from each end cap 60B towards a middle portion of the center rail 60A leaving a gap between each caster rail mount 60C and the caster rail 60A.

In one aspect of the present invention, the components of the lower frame assembly 36 are composed from steel and welded together. The lower frame assembly 36 is coated using a powder coating process.

Returning to FIGS. 1A-1F, the first adjacent side 18 is opposite the second adjacent side 20. The leg rest side 22 is opposite the backrest side 24. Each of the first and second adjacent sides 18, 20 has a first end 18A, 20A and a second end 18B, 20B. The first and second ends 18A, 18B, 20A, 20B of the first and second adjacent sides 18, 20 are connected to respective ends of the leg rest and backrest sides 22, 24 such that, in the illustrated embodiment, the bottom portion 16 has a generally rectangular shape.

The wheel assembly 26 is coupled to the bottom portion 16. In the illustrated embodiment, the wheel assembly 26 includes a pair of rear wheel assemblies 76 coupled to the second adjacent side 20 of the bottom portion 16 and a pair of front wheel assemblies 78 coupled to the first adjacent side 18 of the bottom portion 16.

In the illustrated embodiment, the pair of rear wheel assemblies 76 are coupled to the first and caster rail ends 62, 64, respectively. The pair of front wheel assemblies 78 are coupled to the second ends 66B, 68B of the first and second cross-tube supports 66, 68, respectively.

Figure 3A:
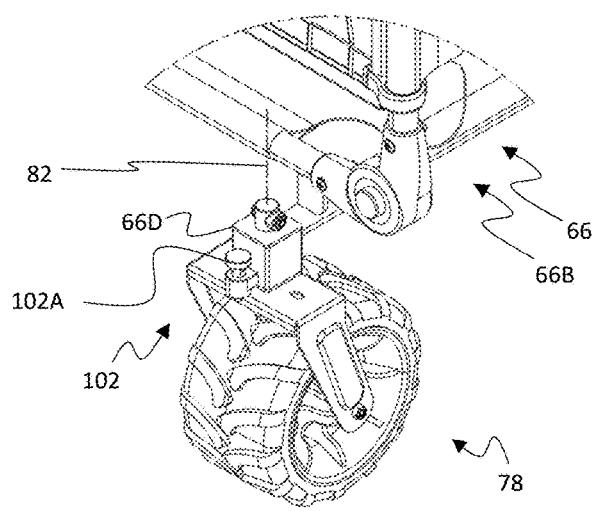
FIG. 3A is a first perspective view of a front wheel assembly of the apparatus of FIG. 1A, according to an embodiment of the present invention.
Figure 3B:
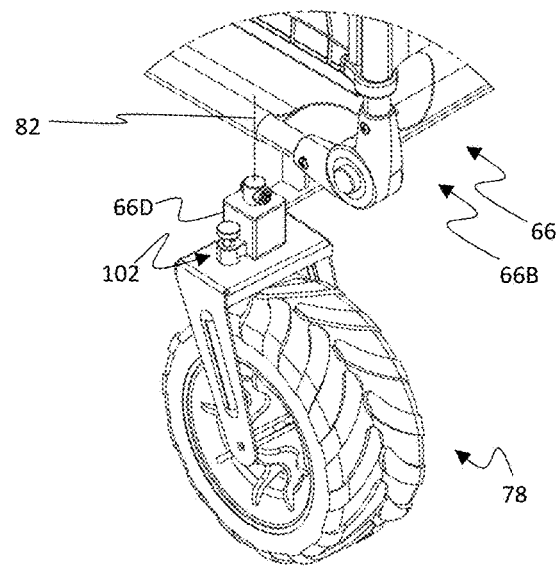
FIG. 3B is a second perspective view of the front wheel assembly of FIG. 3A.
Figure 3C:
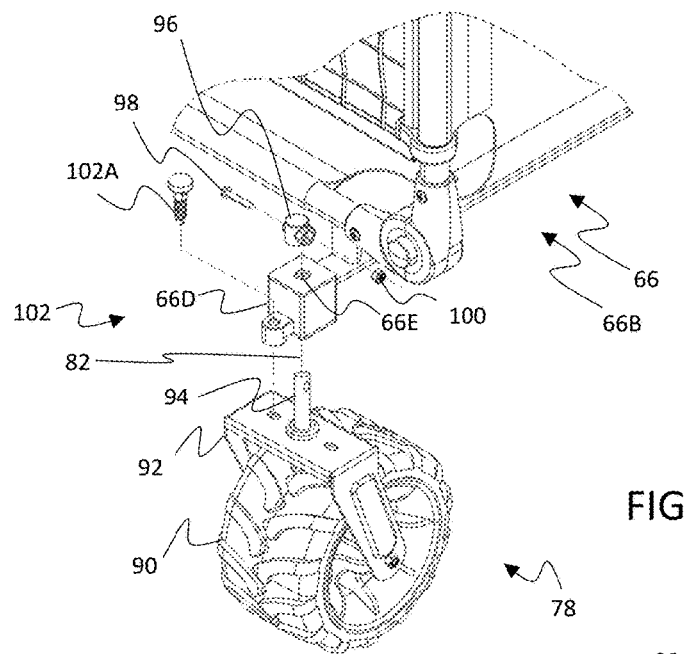
FIG. 3C is a third perspective view of the front wheel assembly of FIG. 3A.

With reference to FIGS. 3A-3C, in the illustrated embodiment, each of the front wheel assemblies 78 has an associated vertical axis 82. The front wheel assemblies 78 are rotatable about the respective vertical axis 82. In FIGS. 3A-3C, only one of the front wheel assemblies 78 is shown. The other front wheel assembly 78 is a mirror of the opposite front wheel assembly 78. The front wheel assembly 78 shown in FIGS. 3A-3C is rotatably coupled to the second end 66B of the first cross-tube support 66.

In the illustrated embodiment, each front wheel assembly 78 includes a front wheel 90 and a front wheel mount 92 with a front wheel mount post 94. The front wheel 90 is rotatably coupled to the front wheel mount 92. The front wheel mount post 92 is located within an aperture, and extends above, the pivot center tube 66D. A front wheel mount cap 96 is positioned over an end of the front wheel mount post 94 and held in place via a mounting fastener 98 inserted through an aperture in the front wheel mount cap 96, through an aperture in the front wheel mount post 94. The end of the mounting fastener 98 is through into, and held in place, by a nylon nut 100 positioned at the opposite end of the aperture in the front wheel mount cap 96.

A spring-biased pop-up braking mechanism or front wheel lock 102 is coupled to an aperture in a braking extension of the pivot center tube 66D which allows the front wheel assembly 78 to be locked relative to the vertical axis 82. In the illustrated embodiment, the front wheel locks 102 lock each of the front wheel assemblies 78 in the position shown in FIG. 3B to help prevent the apparatus 10 from tipping while in use as a lounge chair. It uses a spring plunger 102A to lock into a slot of the respective front wheel 90.

Figure 4:
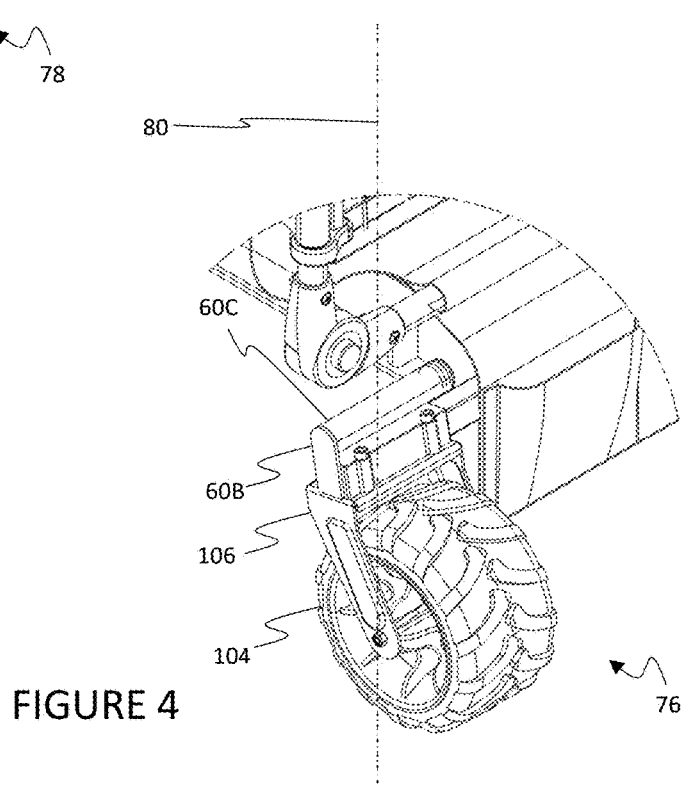
FIG. 4 is a perspective view of a rear wheel assembly of the apparatus of FIG. 1A.

With reference to FIG. 4, each of the rear wheel assemblies 76 has an associated vertical axis 80. The rear wheel assemblies are fixed with respect to the respective vertical axis 80. In one aspect of the present invention, each of the rear wheel assemblies is movable along the caster rail assembly 60. In one aspect of the present invention, each rear wheel assembly 76 may include a side clip that releasable couples the rear wheel assembly 76 to a respective side of the caster rail assembly 60. A In FIG. 4, only one of the rear wheel assemblies 76 is shown. The other rear wheel assembly 76 is a mirror of the opposite rear wheel assembly 76. The rear wheel assemblies 76 shown in FIG. 4 are coupled to the caster rail assembly 60. As shown, each rear wheel assembly 76 includes a rear wheel 104 and a rear wheel mount 106. The rear wheel 104 is rotatably coupled to the rear wheel mount 106. The rear wheel mount 106 is coupled to the caster rail assembly 60 with a portion of the rear wheel mount 106 located within the gap between the respective caster rail 60A and the cater rail mount 60C and fastened to the cater rail assembly 60 by a plurality of fasteners.

Returning to FIGS. 1A-1F, the leg rest portion 28 is rotatably coupled to the leg rest side 22 of the bottom portion 16 and being movable between an outward position and an upright position. The upright position of the leg rest portion 28 is shown in FIGS. 1A-1D and is used when the apparatus 10 is in the cart configuration. In the outward position as shown in FIG. 1E-1F, the leg rest portion 28 is used when the apparatus 10 is in the lounge configuration.

The backrest portion 30 is rotatably coupled to the backrest side 24 of the bottom portion 16 and is movable between an outward position and an upright position. The upright position of the backrest portion 30 is shown in FIGS. 1A-1D and is used when the apparatus 10 is in the cart configuration. In the outward position, the apparatus is in the lounge configuration.

In the illustrated embodiment, the leg rest portion 28 is rotatably coupled to the leg rest side 22 of the bottom portion 16 by a pair of hinges 44. In one aspect of the present invention, the upright position of the backrest portion 30 and the leg rest portion 28 is approximately 90° from a base plane 38 (see below).

In one embodiment, the leg rest portion 28 is rotatable from the upright position to an angle greater than 9020 (the outward position). In another embodiment, the leg rest portion 28 is rotatable from the upright position to an angle of approximately 110°.

In one embodiment of the present invention, the pair of hinges 44 are configured to lock the leg rest portion 28 at the outward position, the upright position and a plurality of predefined positions between the outward position and the upright position. In another embodiment of the present invention, the pair of hinges 44 are configured to lock the backrest portion at the outward position, the upright position and an infinite number of positions in between the outward position and the upright position.

The backrest portion 30 is rotatably coupled to the backrest side 24 of the bottom portion 16 by a pair of hinges 46. In one embodiment, the backrest portion 30 is rotatable from the upright position to an angle of about 90°.

In one embodiment, the pair of hinges 46 are configured to lock the backrest portion 30 at the outward position, the upright position and a plurality of predefined positions between the outward position and the upright position. In another embodiment, the pair of hinges 46 are configured to lock the backrest portion 30) at the outward position, the upright position and an infinite number of predefined positions in between the outward position and the upright position.

The first side portion 32 is configured to be moveable between a first configuration and a second configuration. The second side portion 34 is configured to be moveable between a first configuration and a second configuration. The cart 12 is formed by the bottom portion 16 and the leg rest and backrest portions 22, 24 when in the upright positions, and the first and second side portions 32, 34 when in the first configuration. The cart 12 is configured to hold items placed therein. The bottom portion 16 and the leg rest and backrest portions 28, 30, when in the outward positions, form a seat 14A, a leg rest 14B and a backrest 14C of the lounge chair 14, respectively. The lounge chair 14 is configured to support a person in a sitting or lounging position.

In the illustrated embodiment, the first side portion 32 is configured to be releasably coupled to the leg rest and backrest portions 22, 24 by one or more fasteners, such as hooks, straps or loop and hook fasteners 74 adjacent the first adjacent side 26 when the leg rest and backrest sides 22, 24 are in the upright position. The second side portion 34 is configured to be releasably coupled to the leg rest and backrest portions 28, 30 by one or more fasteners, such as hooks, straps or loop and hook fasteners 74 adjacent the second adjacent side 18 when the leg rest and backrest portions 22, 24 are in the upright positions. However, it should be noted that the first and second side portions 32, 34 may be affixed to the apparatus 10 by other means.

The first and second side portions 32, 34 may be flexible or may be solid, stiff, or inflexible. In some embodiments, the first and second side portions 32, 34 may be only partially attached to the apparatus 10 at one or more locations and releasable connected or attached at other points. The first and second portions 32, 34 may be partially disconnected from the apparatus and rotated, folded, or otherwise moved out of the way. In other embodiments, the first and second portions 32, 34 include spring-actuated rolled-up devices, similar to roll-up blinds.

As shown in FIGS. 1A and 1B, an open carton of the cart 12 is formed by the bottom portion 16 and the leg rest and backrest portions 22, 24 when in the upright positions, and the first and second side portions 32, 34 when connected to the leg rest and backrest sides 22, 24. The open carton of the cart 12 is configured to hold items placed therein.

The bottom portion 16 and the leg rest and backrest portions 28, 30, when in the outward positions, form a seat 14A, a leg rest 14B and a backrest 14C of the lounge chair 14, as shown in FIGS. 1E-1F, respectively. The lounge chair 14 is configured to support a person (shown in phantom lines in FIG. 1E) in a sitting or lounging position.

Figure 5:
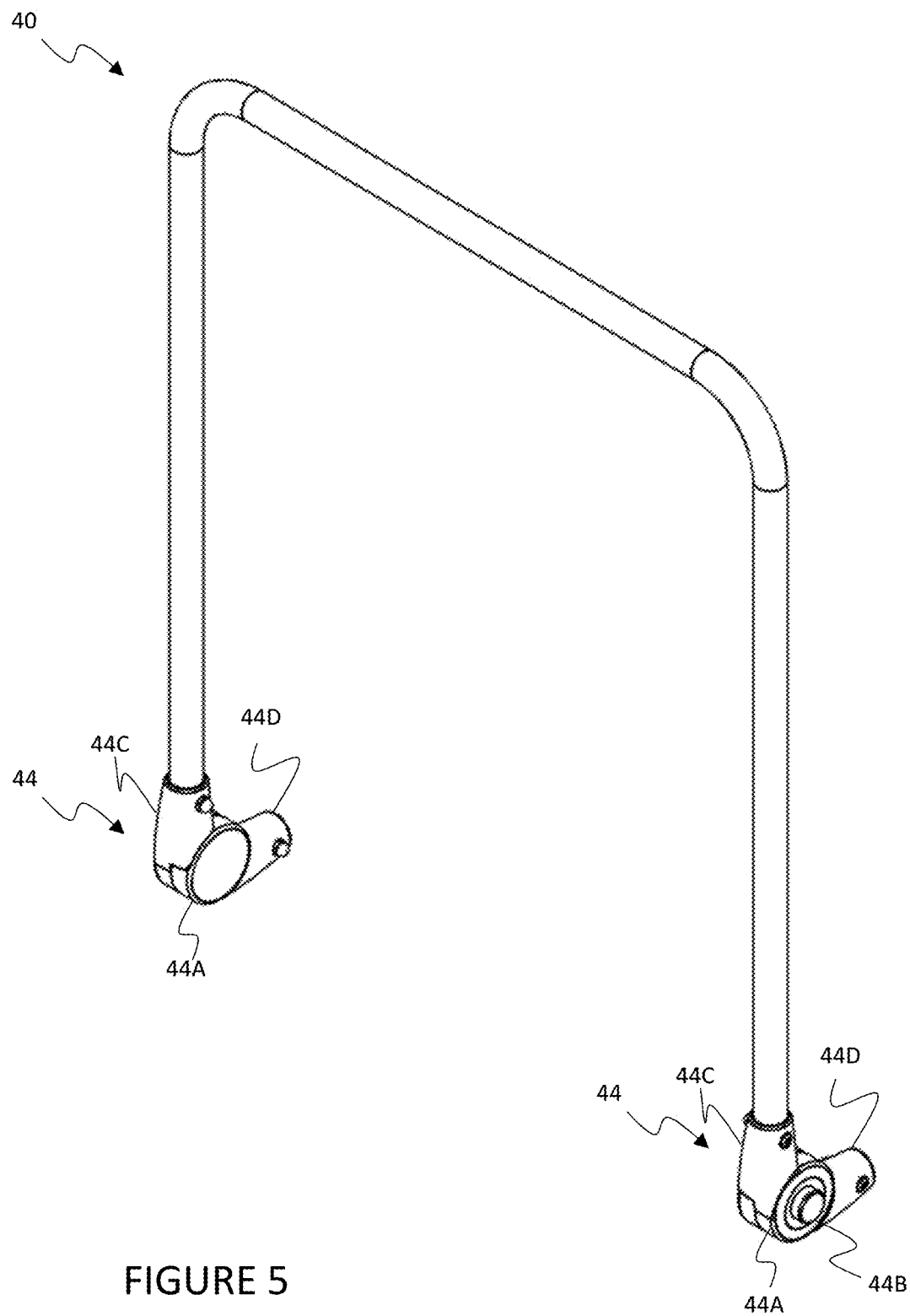
FIG. 5 is a perspective of a leg rest frame and a pair of hinges of the apparatus of FIG. 1A, according to an embodiment of the present invention.

With reference to FIG. 5, in the illustrated embodiment, the leg rest portion 28 includes a leg rest frame 40 pivotably coupled to respective ends of the first and second cross-tubes 70, 72 via the hinges 44. Each leg rest hinge 44 includes a base 44A, a release button 44B and first and second arms 44C, 44D coupled to the base 44A. As shown, the leg rest frame 40 has a generally u-shape with two ends. Each end of the leg rest frame 40 is inserted into an aperture in the first arm 44C of a respective leg rest hinge 44 and affixed thereto using one or more fasteners. An end of the first and second cross-tubes 70, 72 is inserted into an aperture in the second arm 44D of a respective leg rest hinge 44 and affixed thereto using one or more fasteners. In one embodiment, the leg rest frame 40 is composed from powdered coated steel.

Figure 6:
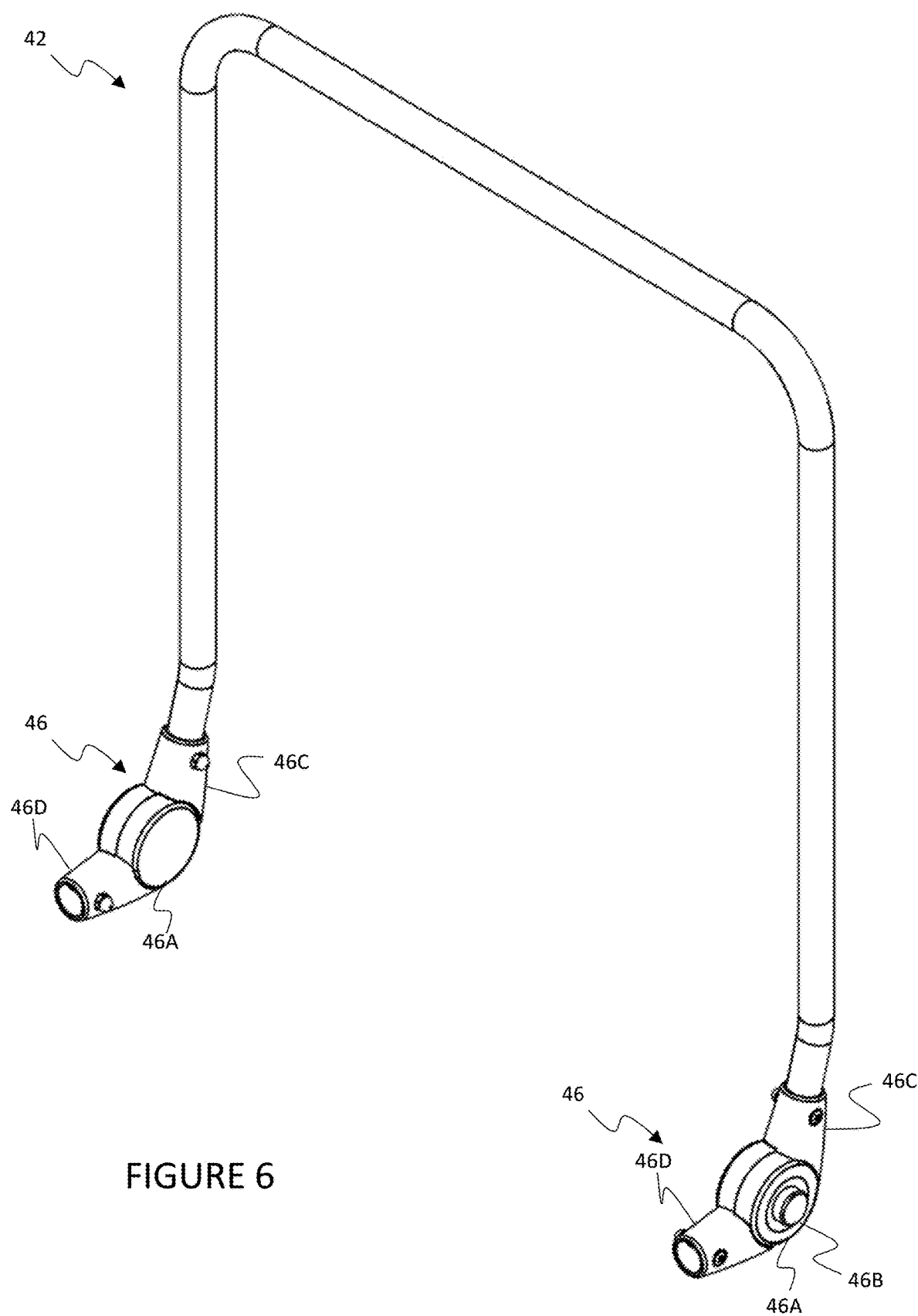
FIG. 6 is a perspective of a backrest frame and a pair of hinges of the apparatus of FIG. 1A, according to an embodiment of the present invention.

With reference to FIG. 6, in the illustrated embodiment, the backrest portion 30 includes a backrest frame 42 pivotably coupled to respective ends of the first and second cross-tubes 70, 72 via the hinges 46. Each leg rest hinge 46 includes a base 46A, a release button 46B and first and second arms 46C, 46D coupled to the base 46A. As shown, the leg rest frame 42 has a generally u-shape with two ends. Each end of the backrest frame 42 is inserted into an aperture in the first arm 46C of a respective backrest hinge 46 and affixed thereto using one or more fasteners. An end of the first and second cross-tubes 70, 72 is inserted into an aperture in the second arm 44D of a respective leg rest hinge 46 and affixed thereto using one or more fasteners. In one embodiment, the backrest frame 42 is composed from powdered coated steel.

The leg rest frame 40 and the backrest frame 42 have a height in a direction extending away from the lower frame assembly 36. In one embodiment, the height of the leg rest frame 40 and the backrest frame 42 are less than a length of the lower frame assembly 36. This allows the leg rest frame 40 and the back rest frame 42 to be rotatably inwardly and positioned adjacent the lower frame assembly 36 for storage of the apparatus 10. In one embodiment, the height of the leg rest frame 40 and the backrest frame 42 are equal. In another embodiment, the height of one of the leg rest frame 40 and the backrest frame 42 is less than the other one of the leg rest frame 40 and the backrest frame 42.

With reference to FIG. 1F, the leg rest frame 40, the lower frame assembly 36 and the backrest frame 42 define an upper edge 48, a lower edge 50 and two side edges 52 of the lounge chair 14.

Figure 7:
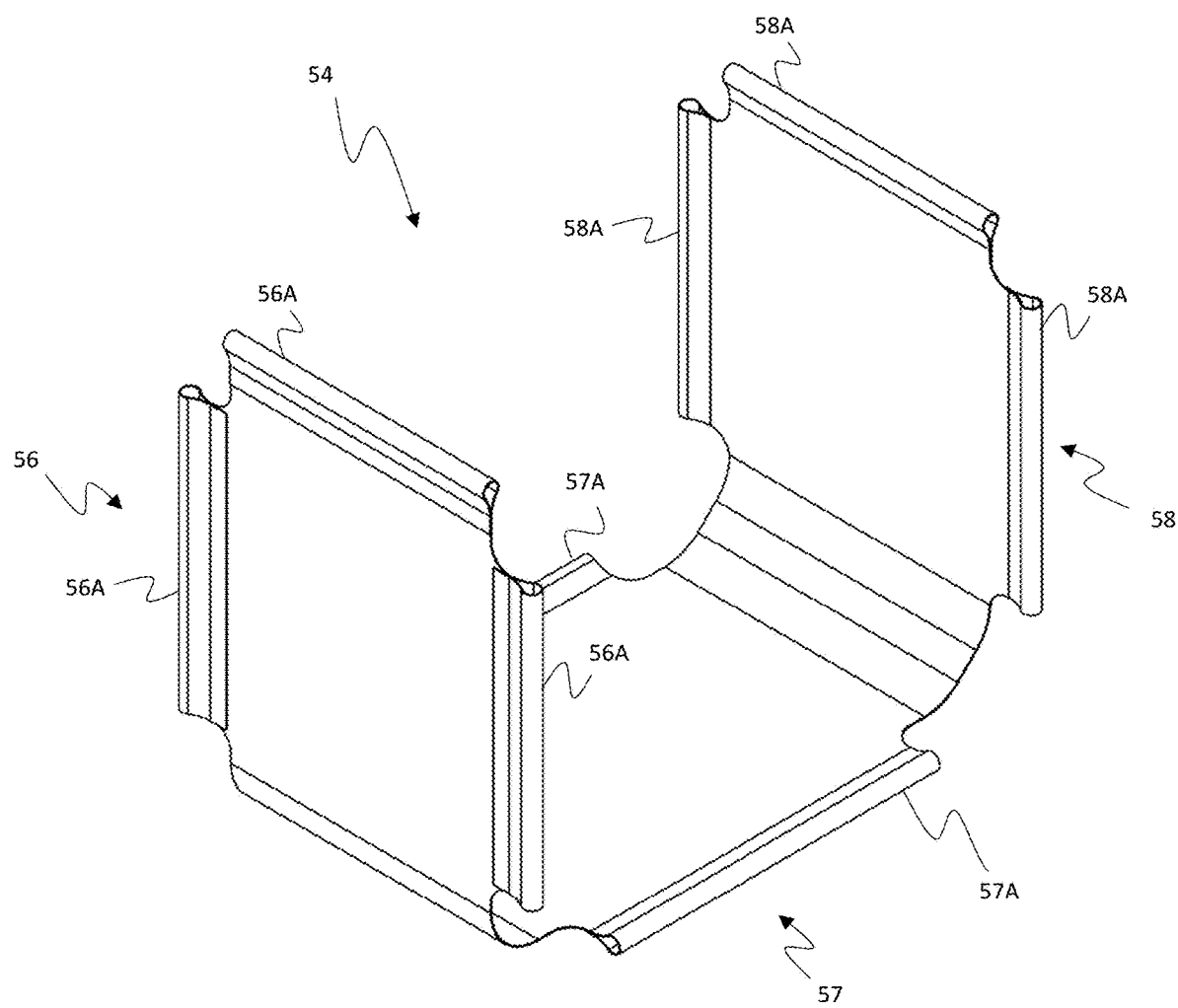
FIG. 7 is a perspective view of a flexible cover of the apparatus of FIG. 1A, according to a first embodiment of the present invention.

With specific reference to FIGS. 7A-7C, in the illustrated embodiment the apparatus 10 further includes a flexible cover 54 coupled to, and supported by, the leg rest frame 40, lower frame assembly 36 and backrest frame 42. The flexible cover 48 extends from the 48 to the lower edge 50 and from one of the side edges 52 to the opposite side edge 52. In the illustrated embodiments, the flexible cover 54 includes a flexible cover leg rest portion 56, a flexible cover seat portion 57, and a flexible cover backrest portion 58. The flexible cover leg rest portion 56 and the leg rest frame 40 form the leg rest portion 28. The flexible cover seat portion 57 and the lower frame assembly 36 form the bottom portion 16. The flexible cover backrest portion 58 and the backrest frame 42 form the backrest portion 30.

In the illustrated embodiment, flexible cover leg rest portion 56 includes a plurality of the leg rest portion sleeves 56A for receiving the leg rest frame 40. The flexible cover seat portion 57 includes a plurality of seat portion sleeves 57A for receiving the first and second cross-tube supports 66, 68. The flexible cover backrest portion 58 includes a plurality of backrest portion sleeves 58A for receive the backrest frame 42. In one embodiment, the flexible cover 54 may be composed from an water-proof or water-resistant fabric.

Figure 8A:
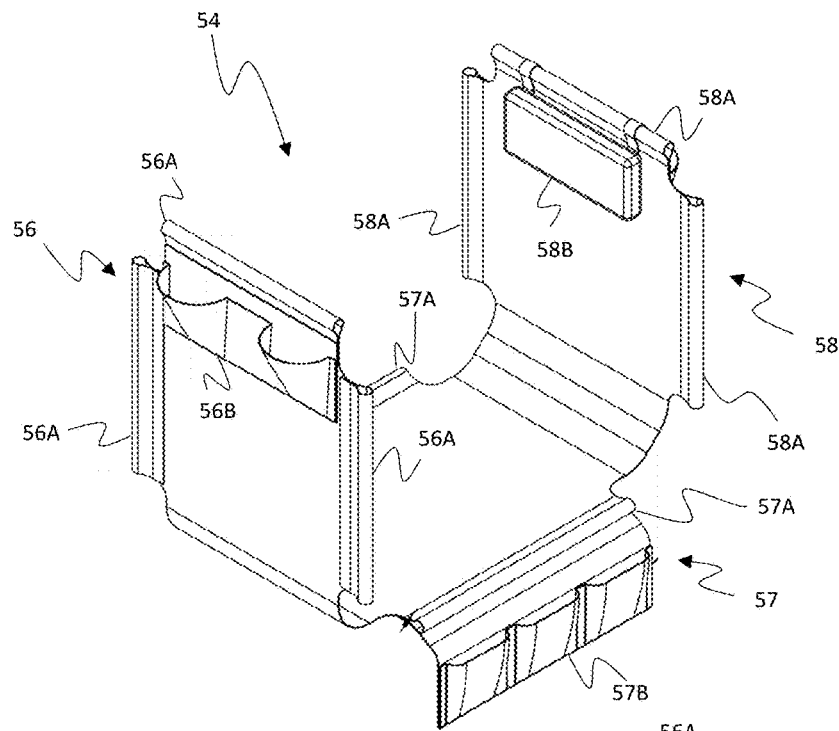
FIG. 8A is a first perspective view of a flexible cover of the apparatus of FIG. 1A, according to a second embodiment of the present invention.
Figure 8B:
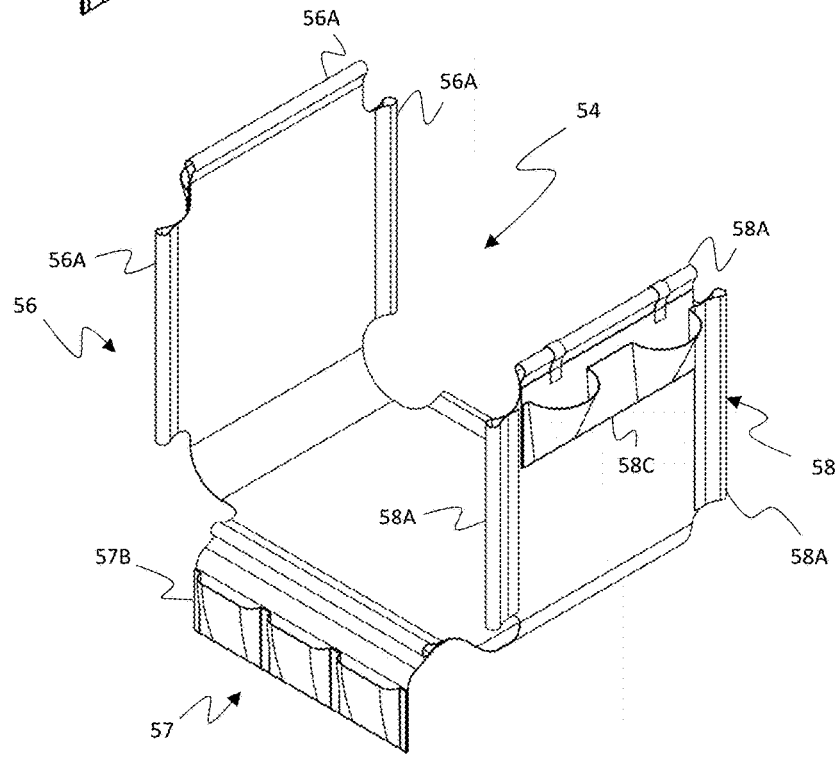
FIG. 8B is a second perspective view of the flexible cover of FIG. 8A.

As shown in FIGS. 8A-8B, the flexible leg rest portion 56 may include a series of upper storage pockets 56B affixed thereto. The flexible cover seat portion 57 may includes a series of side storage pockets 57B attached thereto. The flexible cover backrest portion 58 may include a pillow 58B and a series of upper storage pockets 58C.

As shown in FIGS. 1A-1F, the apparatus 10 further includes a handle 84 rotatably coupled to one of the adjacent sides of the bottom portion 16. As shown, in the illustrated embodiment, the handle 84 is rotatably coupled to the second cross-tube 72.

Figure 9:
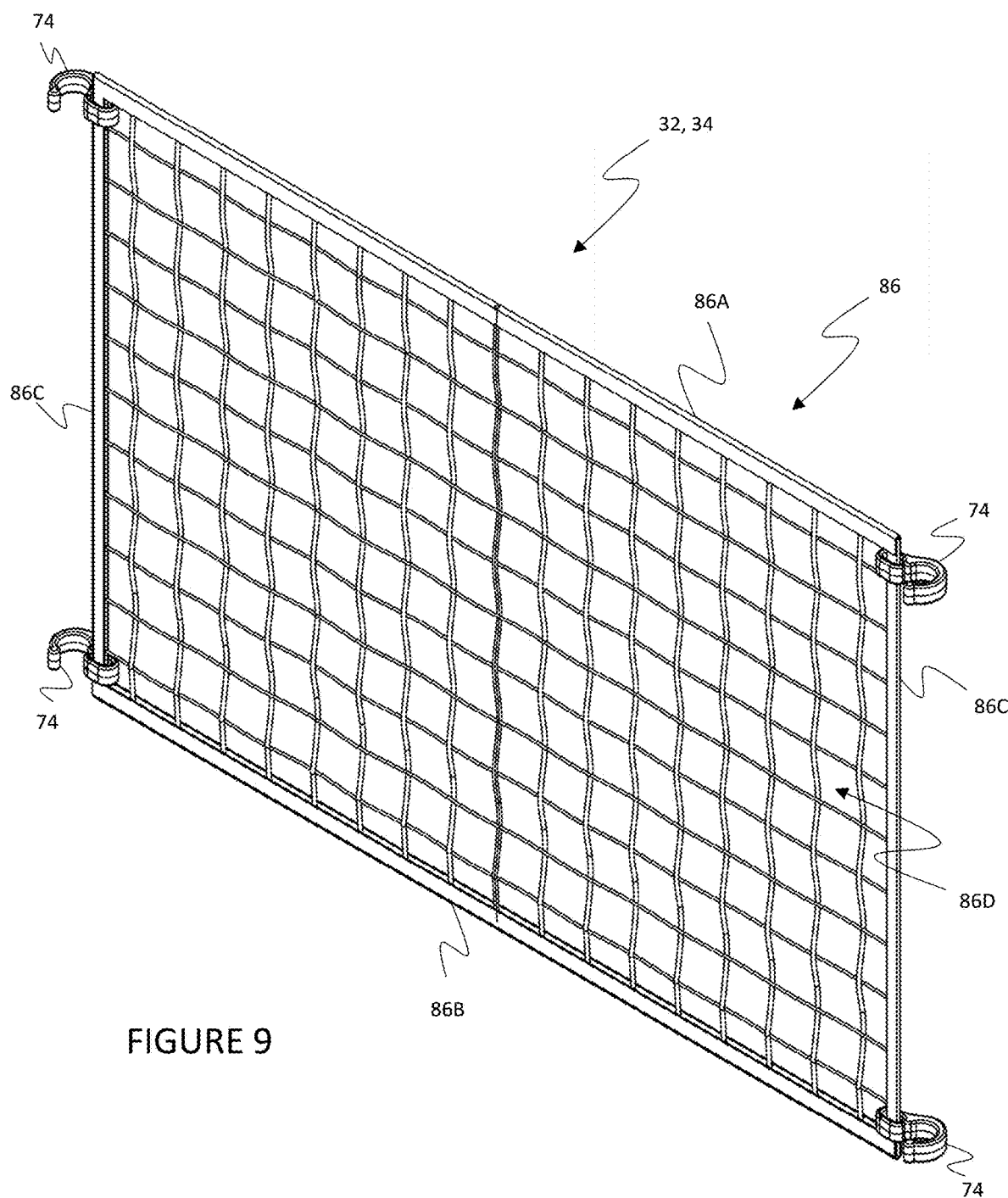
FIG. 9 is a perspective view of first and second side portions of the apparatus of FIG. 1.
Figure 10A:
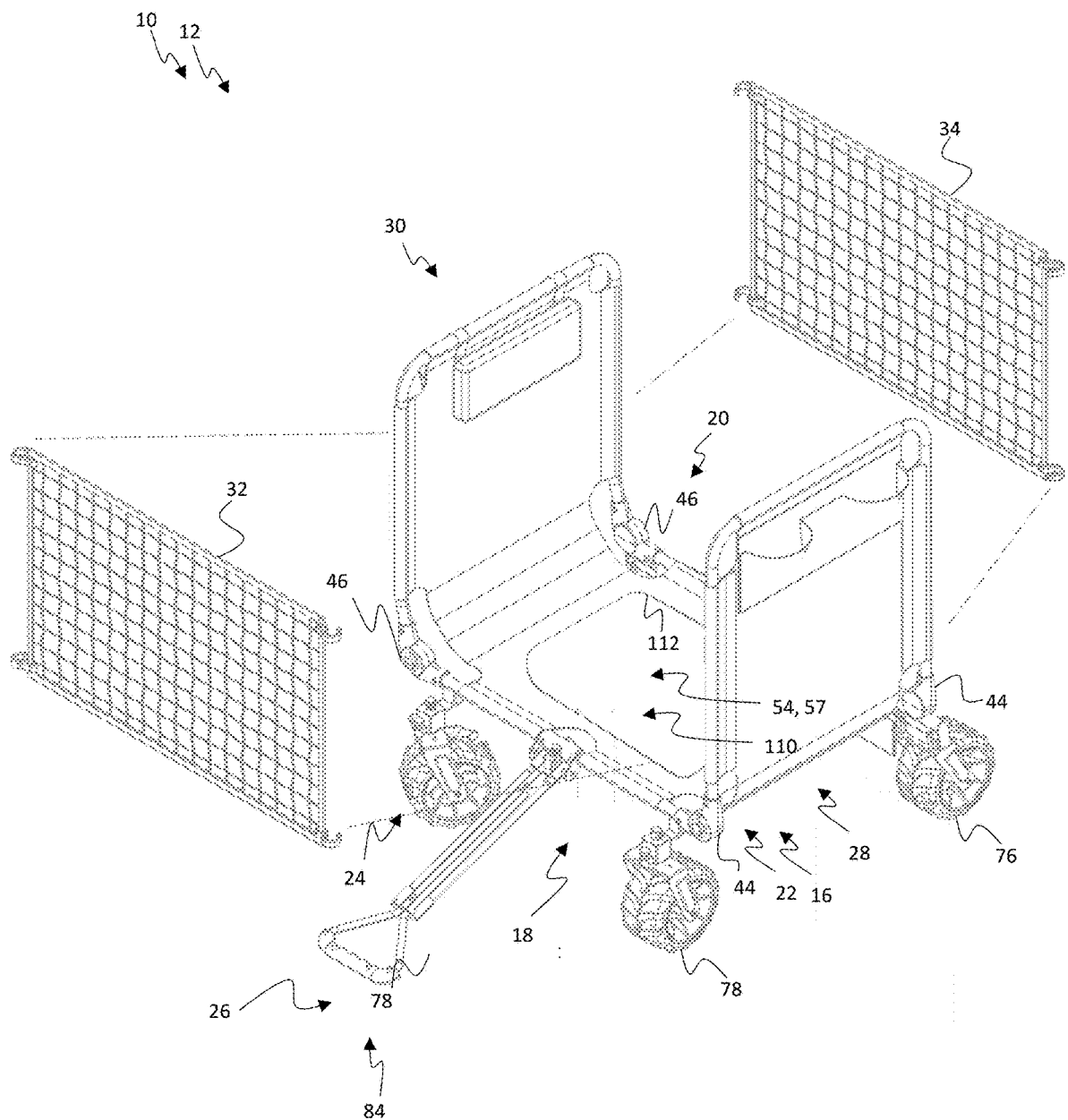
FIG. 10A is a first perspective view of an apparatus configured to convert between a mobile cart and a lounge chair with a cooler mounted below a bottom portion of the apparatus, according to a second embodiment of the present invention.
Figure 10B:
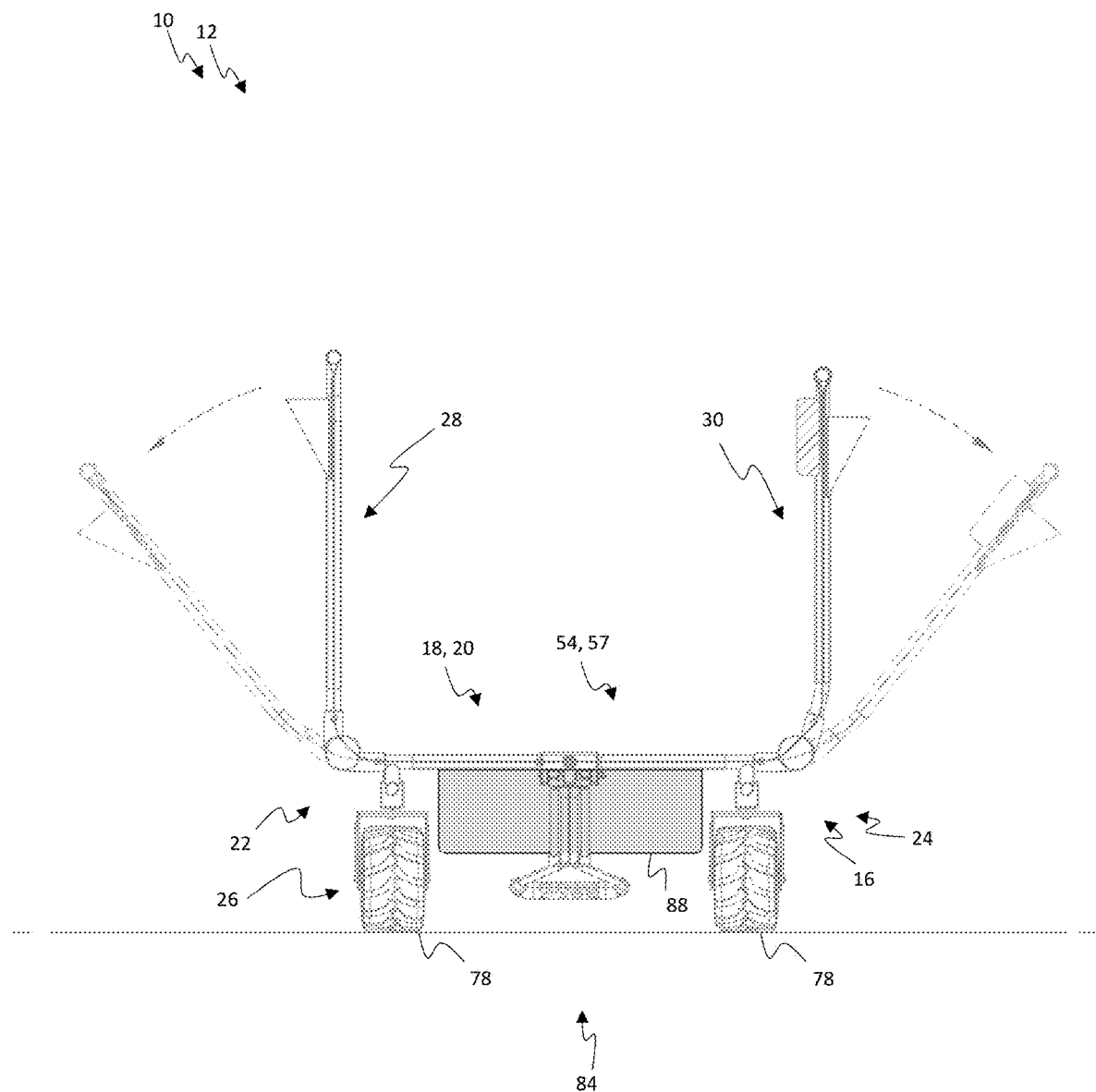
FIG. 10B is a first cross-sectional view of the apparatus of FIG. 10A.
Figure 10C:
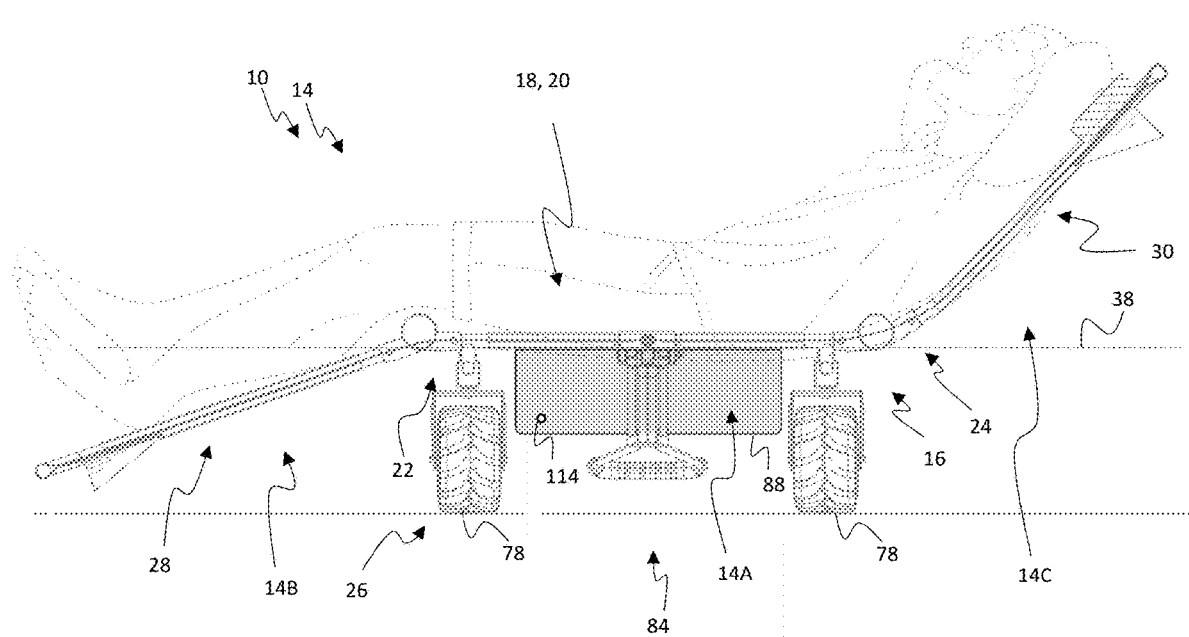
FIG. 10C is a second cross-sectional view of the apparatus of FIG. 10A.
Figure 10E:
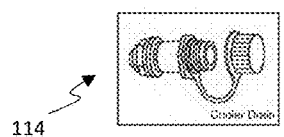
FIG. 10E is a perspective view of a drain plug of the cooler of FIG. 10A.
Figure 10F:
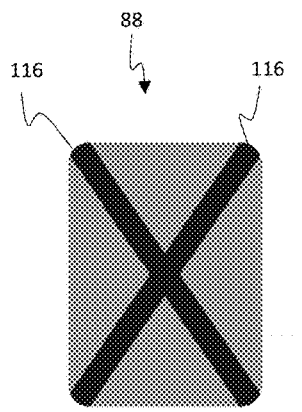
FIG. 10F is a bottom view of the cooler of FIG. 10A.
Figure 10D:
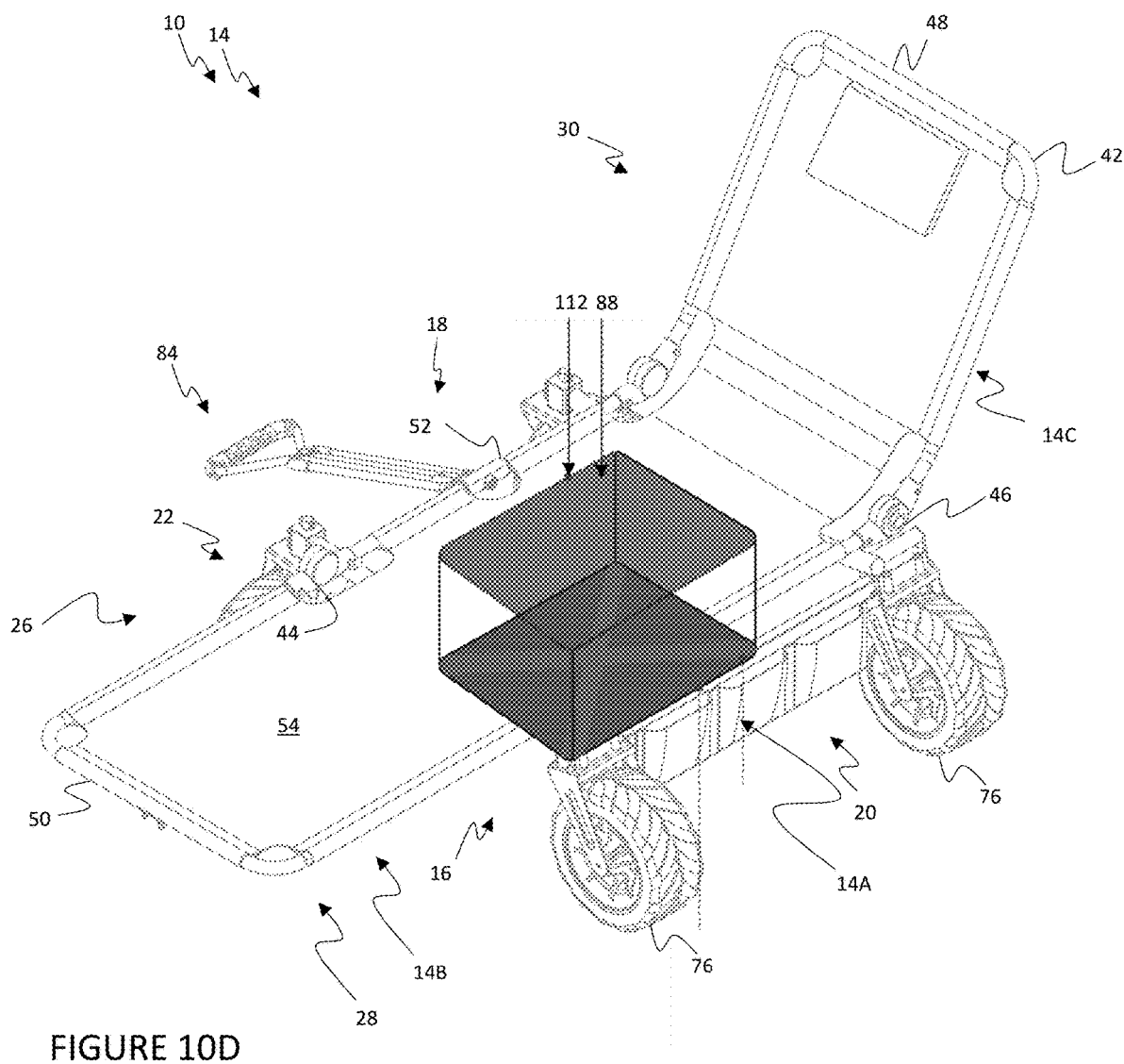
FIG. 10D is a second perspective view of the apparatus of FIG. 10A displaying a location of the cooler relative to the bottom portion.

With reference to FIG. 9, the first and second portions 32, 34 is made of a flexible material such as a water-proof or water-resistant material, such as nylon. In the illustrated embodiment, each of the first and second portions 32, 34 has an outer edge band 86 with upper and lower edges 86A, 86B and two side edges 86C in a rectangular configuration and a nylon net 88D connected to, and extending between the upper and lower edges 86A, 86B and the two side edges 86C. As shown, each of the first and second portions 32, 34 may be removable coupled to the leg rest and backrest portions 28, 30 by a plurality of cargo-net hooks 74.

With specific reference to FIGS. 10A-10F, in another embodiment of the present invention, an apparatus 10, configured to convert between a cart 12 and a lounge chair 14, includes a cooler 88 mounted below the bottom portion 16. With specific reference to FIG. 10F, the cooler 88 is shown relative to the apparatus 10 (which has been greyed out). With specific reference to FIG. 10A, the bottom portion 16 includes an access section 110 located therein to provide access to the cooler 88. In the illustrated embodiment, the access section 110 is provided with the seat portion 57 of the flexible cover 54. The access section 110 is provided with a fastener 112, such as a zipper or hook and loop fasteners, to controllably provide access to the cooler 88. In the illustrated embodiment, the cooler 88 is provided with a drain plug 114 to allow fluid, e.g., melted ice, to be drained from an interior of the cooler 88. With reference to the bottom view of the cooler 88 shown in FIG. 10F, the cooler 88 may be supported by a plurality of straps 116 mounted to the lower frame assembly 36.

Figure 11A:
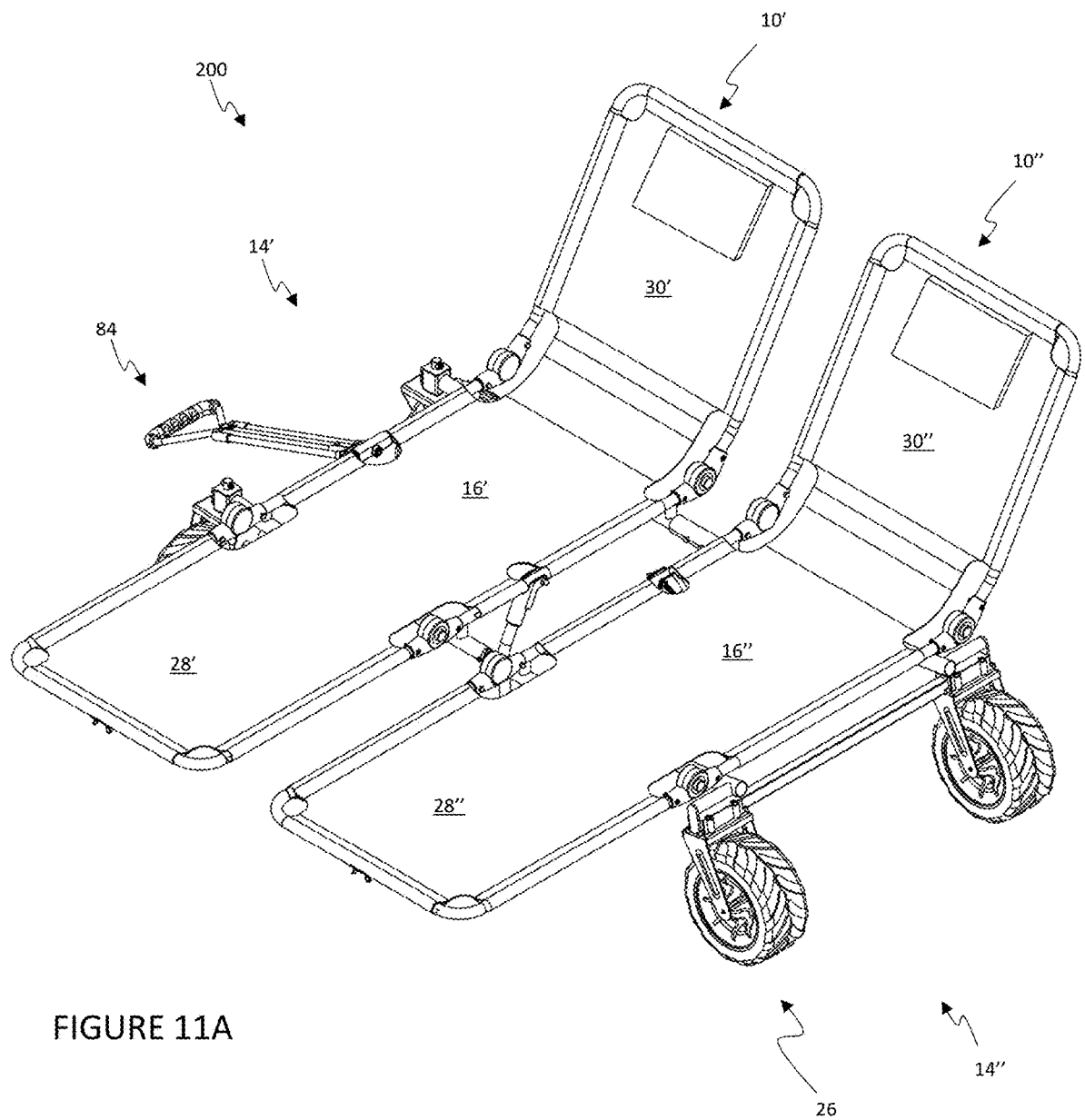
FIG. 11A is a perspective view of an apparatus configured to convert between a mobile cart and two lounge chairs.
Figure 11B:
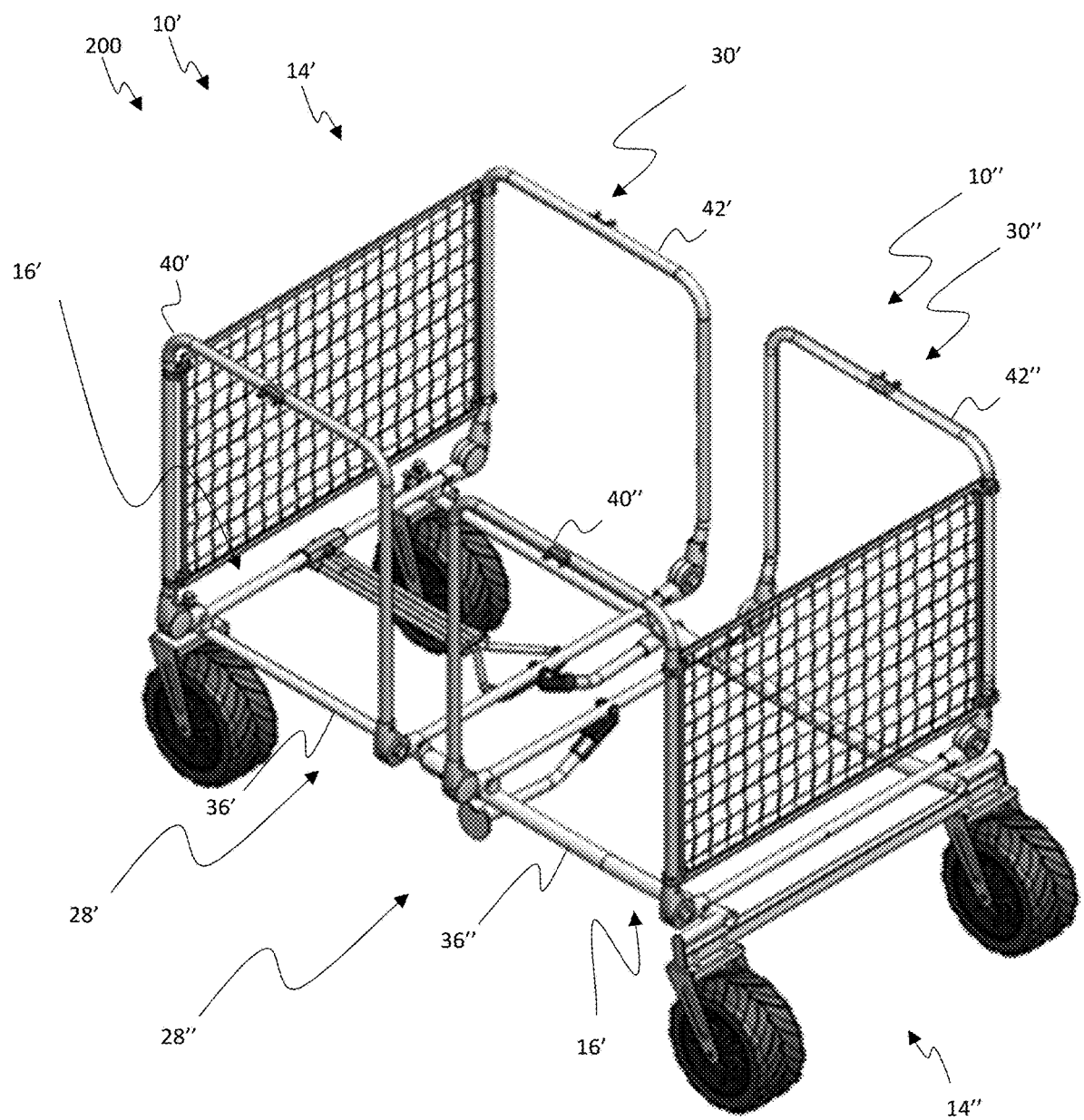
FIG. 11B is a perspective view of a part of the apparatus of FIG. 11A.

With reference to FIGS. 11A-11B, in a second embodiment, a system 200 is configured to be converted between a cart and first and second lounge chairs 14', 14". Alternatively, two apparatuses 10 as described above may be connected together to form the apparatus 10'. The apparatus 10' includes first and second bottom portions 16', 16" and a wheel assembly 26. The apparatus further includes first and second leg rest portion 28', 28" and first and second backrest portion 30', 30".

The first lounge chair 14' is composed of the first bottom portion 16', the first leg rest portion 28' and the first backrest portion 30'. The second lounge chair 14" is composed of the second bottom portion 16", the second leg rest portion 28" and the second backrest portion 30". The apparatus 10' and the first and second lounge chairs 14', 14" operate in a manner similar to the apparatus 10 as described above. For example, when the first and second leg rest portion 28', 28" and the first and second backrest portion 30', 30" are in an upright position and the first and second portions 32, 34, as shown and discussed above, may be used to complete a cart. In this embodiment, the first and second lounge chairs 14', 14" are connected and cannot be separated. As shown in FIG. 11B, each backrest portion 30', 30" includes a respective backrest frame 42', 42"; each bottom portion 16', 16" includes a lower frame assembly 36', 36" and each leg rest portion 28', 28" includes a leg rest frame 40', 40". The apparatus 10' folds for storage by folding the back rest portions 30', 30" and the leg rest portions 28', 28" down and by folding in half it at the middle of the two lounge chairs 14', 14".

Figure 12A:
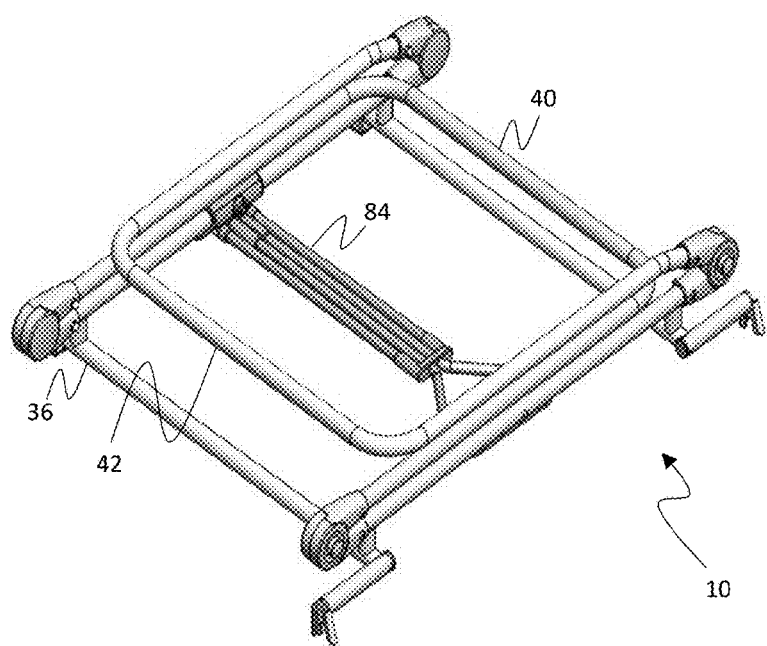
FIG. 12A is a perspective view of a portion of a lower frame assembly, wheel assembly, and leg rest and backrest frames of an apparatus configured to convert between a mobile cart and a lounge chair, according to an alternative embodiment of the present invention.
Figure 12B:
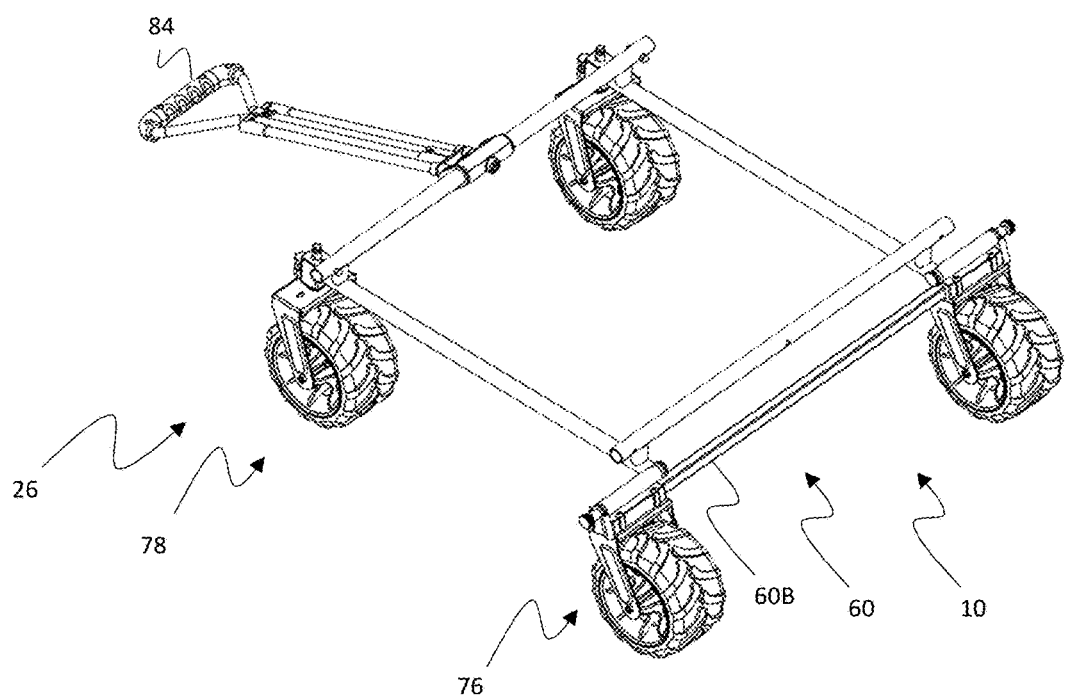
FIG. 12B is a perspective view of the lower frame assembly and wheel assembly of FIG. 12A.

With reference to FIGS. 12A-12F, in an alternative embodiment, the rear wheel assemblies 76 and the front wheel assemblies 78 are removable for storage and/or shipping. As stated above, the leg rest frame 40 and the backrest frame 42 may be rotatably inwardly as shown in FIG. 12A and 12G such that the lower frame assembly 36, the leg rest frame 40 and the backrest frame 42 are in a generally flat configuration, i.e., in line with each other (as shown). In the illustrated, each of the front wheel assemblies 78 are separately removable and the rear wheel assemblies 76 are removable along with the caster rail 60B of the caster rail assembly 60. Alternatively, as shown in FIG. 12G, the leg rest frame 40 and the backrest frame 42 may be folded inward for storage without removable of the wheel assemblies 76, 78.

Figure 12C:
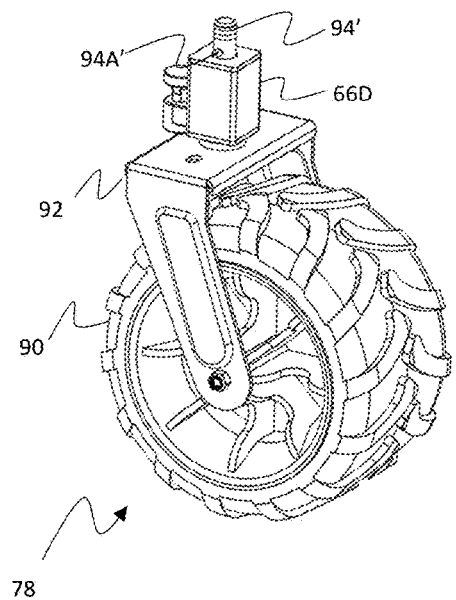
FIG. 12C is a first perspective view of a front wheel of the wheel apparatus of FIG. 12A.
Figure 12D:
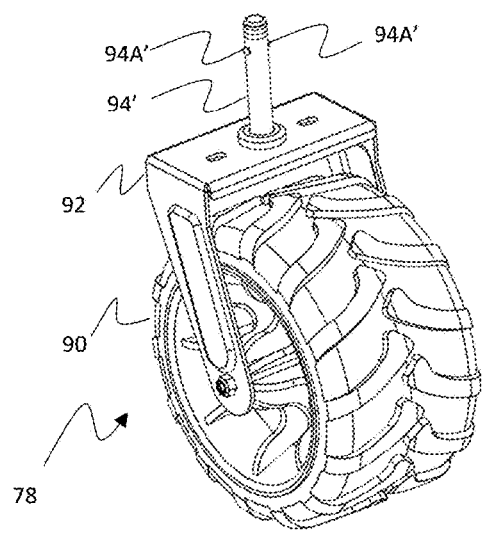
FIG. 12D is a second perspective view of the front wheel of FIG. 12C.

With particular reference to FIGS. 12C and 12D, in the illustrated embodiment, each of the front wheel assemblies 78 include a modified front wheel post 94'. The front wheel post 94' includes a pair of spring biased button pins 94A'. When the front wheel assemblies 78 are installed, the spring biased button pins 94A' are biased outward and above the aperture in the pivot center tube of first cross-tube support 66D as shown. To remove each front wheel assembly 78 the spring biased button pins 94A' may be pressed inward to allow the front wheel assembly 78 to be removed. The spring biased button pins 94A' stay within the modified front wheel post spring biased button pins 94A' to ensure that no components are misplaced.

Figure 12E:
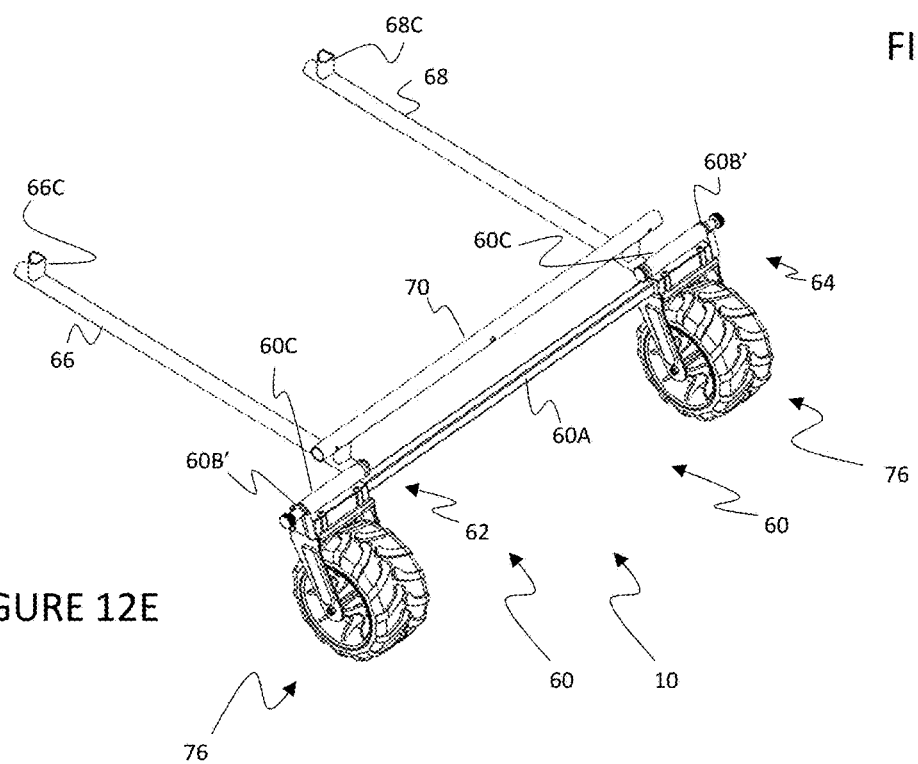
FIG. 12E is a perspective view of a portion of the lower frame assembly and wheel assembly of FIG. 12A.
Figure 12F:
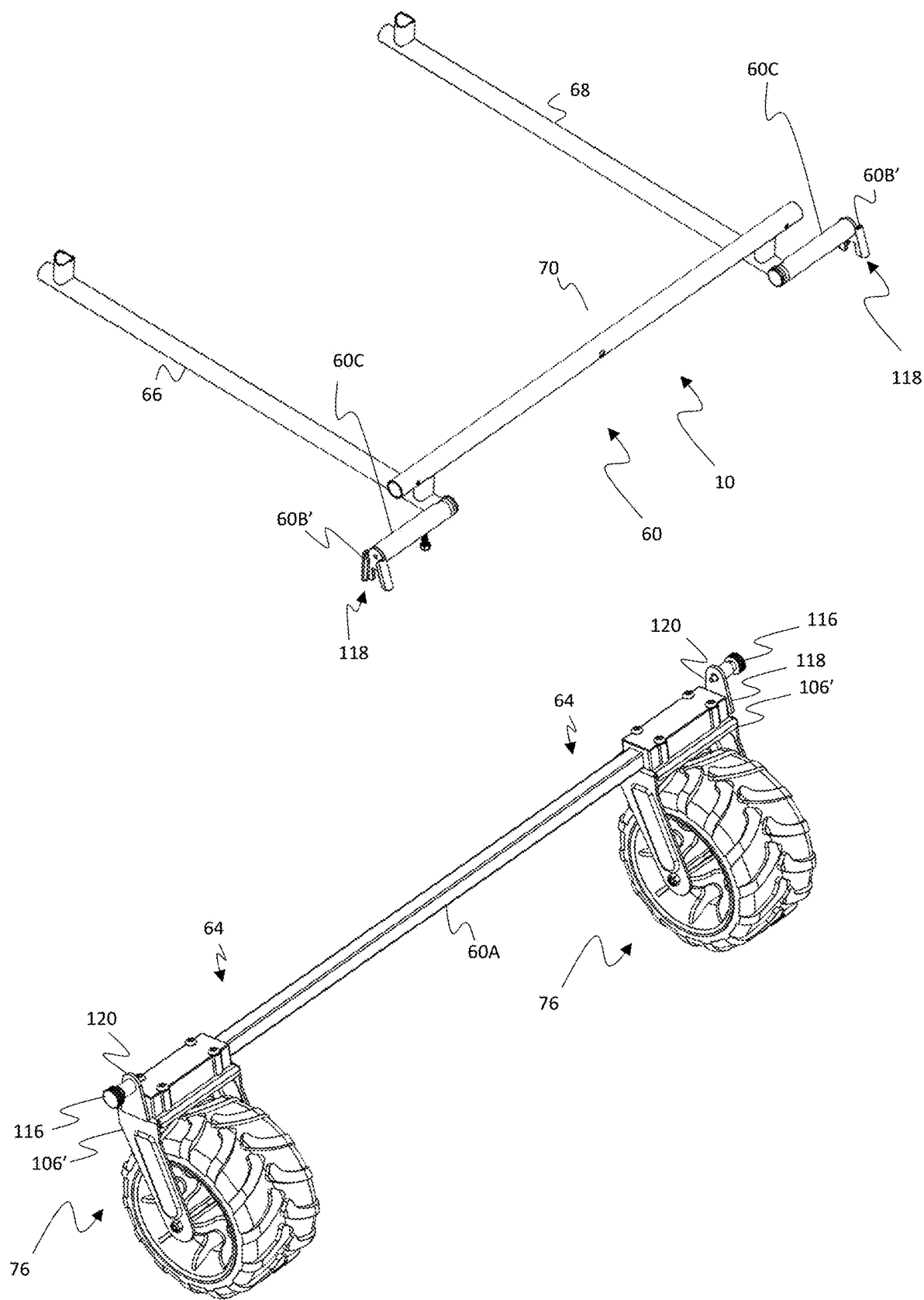
FIG. 12F is a second perspective view of a portion of the lower frame assembly and wheel assembly of FIG. 12A; and, FIG. 12G is a perspective view of a partial view of the apparatus of FIG. 12A.
Figure 12G:
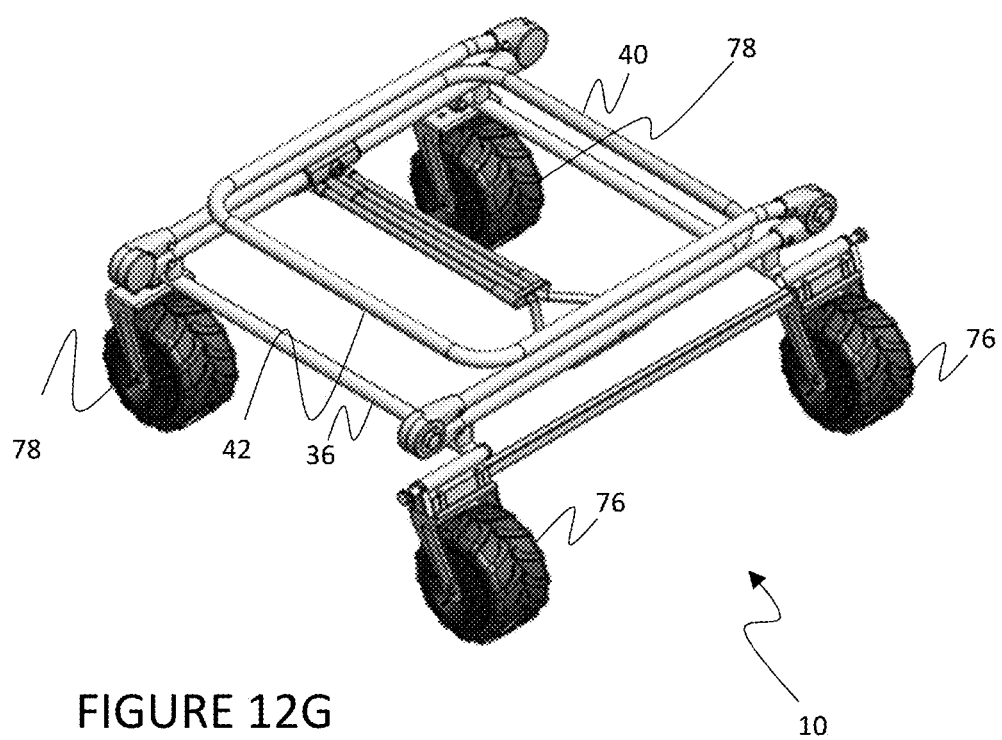

With particular reference to FIGS. 12E-12F, in the illustrated embodiment, the pair of rear wheel assemblies 76 are connected to the caster rail 60D of the caster rail assembly 60. The caster rail 60D along with the attached rear wheel assemblies 76 may be removed from the rest of the caster rail assembly 60 and lower frame assembly 36. As shown, the caster rail assembly 60A includes a caster rail mount 60C and a modified caster rail end cap 60B. The modified caster rail end caps 60B includes a pair of slots 118 in a v-shaped configuration. The rear wheel assembly 76 include a modified rear wheel mounts 106' with a wheel mount extension 120. The wheel mount extensions 120 have a shape that generally matches v-shaped slots 118. The v-shaped slots 118 are configured to receive the wheel mount extension 120 and guide the respective rear wheel assembly 76 into place. Each wheel mount extension 120 includes a cylindrical port for receiving respective retractable spring plungers 116. With the rear wheel assemblies 76 installed, the respective spring plunger 116 may be pulled outward, disengaging the plunger 116 from the modified caster rail end cap 60B. To install the rear wheel assemblies 76, the slots 118 will help guide the rear wheel assemblies 76 into position. A pin of each spring plunger 116 will engage a hole within the modified caster rail end cap 60B to lock the assemblies 76 in place.

It should be noted that as shown in FIG. 12G, the leg rest frame 40 and the backrest frame 42 may be rotatably inwardly as shown to the generally flat configuration for storage without removal of the front and rear wheel assemblies 78, 76.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. An apparatus configured to convert between a cart and a lounge chair, comprising:
   a bottom portion having first and second adjacent sides, a leg rest side and a backrest side, the first adjacent side being opposite the second adjacent side, the leg rest side being opposite the backrest side, each of the first and second adjacent sides have first and second ends, the first and second ends of the first and second adjacent sides being connected to respective ends of the leg rest and backrest sides;
   a wheel assembly, including a pair of rear wheel assemblies and a pair of front wheel assemblies, coupled to the bottom portion;
   a leg rest portion rotatably coupled to the leg rest side of the bottom portion and being movable between an outward position and an upright position;
   a backrest portion rotatably coupled to the backrest side of the bottom portion and being movable between an outward position and an upright position, wherein the bottom portion includes a lower frame assembly, the leg rest portion includes a leg rest frame, and the backrest portion includes a backrest frame, the lower frame assembly defining a base plane of the apparatus, the leg rest frame being pivotably coupled to the leg rest side of the bottom portion by a pair of hinges, the backrest frame coupled to the backrest side of the bottom portion by a pair of hinges, wherein the lower frame assembly includes a caster rail assembly, first and second cross-tube supports and first and second cross tubes, the caster rail assembly having a first caster rail end and a second caster rail end and being located along the backrest side of the bottom portion, each of the first and second cross-tube supports having a first end connected adjacent the first and second caster rail ends, respectively and extending away from the caster rail assembly towards respective second ends, the first and second cross-tube supports forming the leg rest and backrest sides, respectively, of the bottom portion, the first cross tube being coupled adjacent to, and extending between, the first ends of the first and second cross-tube supports, the second cross tube being coupled adjacent to, and extending between, the second ends of the first and second cross-tube supports;
   a first side portion configured to be moveable between a first configuration and a second configuration; and,
   a second side portion configured to be moveable between a first configuration and a second configuration, wherein the cart is formed by the bottom portion and the leg rest and backrest portions when in the upright positions, and the first and second side portions when in the first configuration, the cart configured to hold items placed therein, wherein the bottom portion and the leg rest and backrest portions, when in the outward positions, form a seat, a leg rest and a backrest of the lounge chair, respectively, the lounge chair being configured to support a person located thereon.

2. An apparatus, as set forth in claim 1, wherein the front wheel assemblies are rotatable about a respective vertical axis.

3. An apparatus, as set forth in claim 1, wherein the leg rest frame, the lower frame assembly and the backrest frame define an upper edge, a lower edge and two side edges of the lounge chair, the apparatus further including a flexible cover coupled to, and supported by, the leg rest frame, lower frame assembly and backrest and extending from the upper edge to the lower edge and from one of the side edges to an opposite side edge.

4. An apparatus, as set forth in claim 3, wherein the flexible cover includes a flexible cover leg rest portion, a flexible cover seat portion, and a flexible cover backrest portion, the flexible cover leg rest portion and the leg rest frame forming the leg rest portion, the flexible cover seat portion and the lower frame assembly forming the bottom portion, and the flexible cover backrest portion and the backrest frame forming the backrest portion.

5. An apparatus, as set forth in claim 4, wherein the pair of rear wheel assemblies are coupled to the first and caster rail ends, respectively and the pair of front wheel assemblies are coupled to the second ends of the first and second cross-tube supports, respectively.

6. An apparatus, as set forth in claim 5, each of the rear wheel assemblies having an associated vertical axis, the rear wheel assemblies being fixed with respect to the vertical axis of the respective rear wheel assembly, each of the front wheel assemblies having an associated vertical axis, the front wheel assemblies being rotatable about the respective vertical axis.

7. An apparatus, as set forth in claim 1, further including a handle rotatably coupled to one of the adjacent sides of the bottom portion.

8. An apparatus, as set forth in claim 1, wherein each of the first and second removable portions have an outer edge band with upper and lower edges and two side edges in a rectangular configuration and a nylon net connected to, and extending between, the upper and lower edges and the two side edges.

9. An apparatus, as set forth in claim 1, wherein each of the first and second removable portions are coupled to the leg rest and backrest portions by a plurality of cargo-net hooks.

10. An apparatus, as set forth in claim 1, further including a cooler mounted below the bottom portion, the bottom portion including an access section located therein to provide access to the cooler.

11. An apparatus, as set forth in claim 1, wherein the leg rest portion and the backrest portion are configured to be rotated to a flat position for storage.

12. An apparatus, as set forth in claim 1, wherein each front wheel assembly includes front wheel lock configured to controllably lock the front wheel assemblies to prevent tipping.

13. An apparatus configured to convert between a cart and a lounge chair, comprising:
  a bottom portion having first and second adjacent sides, a leg rest side and a backrest side, the first adjacent side being opposite the second adjacent side, the leg rest side being opposite the backrest side, each of the first and second adjacent sides have first and second ends, the first and second ends of the first and second adjacent sides being connected to respective ends of the leg rest and backrest sides, wherein the bottom portion includes a lower frame assembly defining a base plane of the apparatus;
  a wheel assembly includes a pair of rear wheel assemblies and a pair of front wheel assembly and is coupled to the bottom portion;
  a leg rest portion rotatably coupled to the leg rest side of the bottom portion and being movable between an outward position and an upright position, wherein the leg rest portion includes a leg rest frame pivotably coupled to the leg rest side of the bottom portion by a pair of hinges;
  a backrest portion rotatably coupled to the backrest side of the bottom portion and being movable between an outward position and an upright position, wherein the backrest portion includes a backrest frame coupled to the backrest side of the bottom portion by a pair of hinges, wherein the bottom portion includes a lower frame assembly, the leg rest portion includes a leg rest frame, and the backrest portion includes a backrest frame, the lower frame assembly defining a base plane of the apparatus, the leg rest frame being pivotably coupled to the leg rest side of the bottom portion by a pair of hinges, the backrest frame coupled to the backrest side of the bottom portion by a pair of hinges, wherein the lower frame assembly includes a caster rail assembly, first and second cross-tube supports and first and second cross tubes, the caster rail assembly having a first caster rail end and a second caster rail end and being located along the backrest side of the bottom portion, each of the first and second cross-tube supports having a first end connected adjacent the first and second caster rail ends, respectively and extending away from the caster rail assembly towards respective second ends, the first and second cross-tube supports forming the leg rest and backrest sides, respectively, of the bottom portion, the first cross tube being coupled adjacent to, and extending between, the first ends of the first and second cross-tube supports, the second cross tube being coupled adjacent to, and extending between, the second ends of the first and second cross-tube supports;
  a first side portion configured to be moveable between a first configuration and a second configuration;
  a second removable side portion configured to be releasably coupled moveable between a first configuration and a second configuration, wherein the cart is formed by the bottom portion and the leg rest and backrest portions when in the upright positions, and the first and second side portions when in the first configuration, the cart configured to hold items placed therein, wherein the bottom portion and the leg rest and backrest portions, when in the outward positions, form a seat, a leg rest and a backrest of the lounge chair, respectively, the lounge chair being configured to support a person located thereon, wherein each of the first and second removable portions are coupled to the leg rest and backrest portions by a plurality of cargo-net hooks;
  a handle rotatably coupled to one of the adjacent sides of the bottom portion; and,
  a cooler mounted below the bottom portion, the bottom portion including an access section located therein to provide access to the cooler.

14. An apparatus, as set forth in claim 13, wherein the front wheel assemblies are rotatable about a respective vertical axis.

15. An apparatus, as set forth in claim 13, wherein the leg rest portion and the backrest portion are configured to be rotated to a flat position for storage.

16. An apparatus, as set forth in claim 13, wherein each front wheel assembly includes front wheel lock configured to controllably lock the front wheel assemblies to prevent tipping.

17. An apparatus configured to convert between a cart and a lounge chair, comprising:
  a bottom portion having first and second adjacent sides, a leg rest side and a backrest side, the first adjacent side being opposite the second adjacent side, the leg rest side being opposite the backrest side, each of the first and second adjacent sides have first and second ends, the first and second ends of the first and second adjacent sides being connected to respective ends of the leg rest and backrest sides, wherein the bottom portion includes a lower frame assembly defining a base plane of the apparatus, wherein the lower frame assembly includes a caster rail assembly, first and second cross-tube supports and first and second cross tubes, the caster rail assembly having a first caster rail end and a second caster rail end and being located along the backrest side of the bottom portion, each of the first and second cross-tube supports having a first end connected adjacent the first and second caster rail ends, respectively and extending away from the caster rail assembly towards respective second ends, the first and second cross-tube supports forming the first and second adjacent sides, respectively, of the bottom portion, the first cross tube being coupled adjacent to, and extending between, the first ends of the first and second cross-tube supports, the second cross tube being coupled adjacent to, and extending between, the second ends of the first and second cross-tube supports;
  a wheel assembly coupled to the bottom portion, wherein the wheel assembly includes a pair of rear wheel assemblies coupled to the caster rail assembly adjacent the first caster rail end and the second caster rail end, respectively, and a pair of front wheel assemblies coupled to first and second cross-tube supports, respectively, at the respective second end;

a leg rest portion rotatably coupled to the leg rest side of the bottom portion and being movable between an outward position and an upright position, wherein the leg rest portion includes a leg rest frame pivotably coupled to the leg rest side of the bottom portion by a pair of hinges;

a backrest portion rotatably coupled to the backrest side of the bottom portion and being movable between an outward position and an upright position, wherein the backrest portion includes a backrest frame coupled to the backrest side of the bottom portion by a pair of hinges, wherein the bottom portion includes a lower frame assembly, the leg rest portion includes a leg rest frame, and the backrest portion includes a backrest frame, the lower frame assembly defining a base plane of the apparatus, the leg rest frame being pivotably coupled to the leg rest side of the bottom portion by a pair of hinges, the backrest frame coupled to the backrest side of the bottom portion by a pair of hinges, wherein the lower frame assembly includes a caster rail assembly, first and second cross-tube supports and first and second cross tubes, the caster rail assembly having a first caster rail end and a second caster rail end and being located along the backrest side of the bottom portion, each of the first and second cross-tube supports having a first end connected adjacent the first and second caster rail ends, respectively and extending away from the caster rail assembly towards respective second ends, the first and second cross-tube supports forming the leg rest and backrest sides, respectively, of the bottom portion, the first cross tube being coupled adjacent to, and extending between, the first ends of the first and second cross-tube supports, the second cross tube being coupled adjacent to, and extending between, the second ends of the first and second cross-tube supports;

a first side portion configured to be moveable between a first configuration and a second configuration;

a second side portion configured to be moveable between a first configuration and a second configuration, wherein the cart is formed by the bottom portion and the leg rest and backrest portions when in the upright positions, and the first and second side portions when in the first configuration, the cart configured to hold items placed therein, wherein the bottom portion and the leg rest and backrest portions, when in the outward positions, form a seat, a leg rest and a backrest of the lounge chair, respectively, the lounge chair being configured to support a person located thereon;

a handle rotatably coupled to one of the adjacent sides of the bottom portion; and, a cooler mounted below the bottom portion, the bottom portion including an access section located therein to provide access to the cooler, wherein the leg rest frame, the lower frame assembly and the backrest frame define an upper edge, a lower edge and two side edges of the lounge chair; and, a flexible cover coupled to, and supported by, the leg rest frame, lower frame assembly and backrest and extending from the upper edge to the lower edge and from one of the side edges to an opposite side edge, wherein the flexible cover includes a flexible cover leg rest portion, a flexible cover seat portion, and a flexible cover backrest portion, the flexible cover leg rest portion and the leg rest frame forming the leg rest portion, the flexible cover seat portion and the lower frame assembly forming the bottom portion, and the flexible cover backrest portion and the backrest frame forming the backrest portion.

18. An apparatus, as set forth in claim 17, wherein the front wheel assemblies are rotatable about a respective vertical axis.

19. An apparatus, as set forth in claim 17, wherein the leg rest portion and the backrest portion are configured to be rotated to a flat position for storage.

20. An apparatus, as set forth in claim 17, wherein each front wheel assembly includes front wheel lock configured to controllably lock the front wheel assemblies to prevent tipping.

* * * * *